(12) United States Patent
Shimp et al.

(10) Patent No.: US 11,713,002 B2
(45) Date of Patent: Aug. 1, 2023

(54) VEHICLE STORAGE APPARATUS AND SYSTEM

(71) Applicants: Jesse Shimp, Jacksonville, FL (US); Trevor Lee, Jacksonville, FL (US)

(72) Inventors: Jesse Shimp, Jacksonville, FL (US); Trevor Lee, Jacksonville, FL (US)

( * ) Notice: Subject to any disclaimer, the term of this patent is extended or adjusted under 35 U.S.C. 154(b) by 0 days.

(21) Appl. No.: 17/490,459

(22) Filed: Sep. 30, 2021

(65) Prior Publication Data
US 2022/0097616 A1    Mar. 31, 2022

Related U.S. Application Data

(60) Provisional application No. 63/085,923, filed on Sep. 30, 2020.

(51) Int. Cl.
*B60R 9/06*    (2006.01)

(52) U.S. Cl.
CPC ..................... *B60R 9/065* (2013.01)

(58) Field of Classification Search
CPC ................................. B60R 11/06; B60R 9/065
USPC ....................... 224/404; D12/414.1; 296/37.3
See application file for complete search history.

(56) References Cited

U.S. PATENT DOCUMENTS

| | | | | | |
|---|---|---|---|---|---|
| 2,985,333 | A | * | 5/1961 | Kirkman | A47B 88/90 |
| | | | | | 220/533 |
| 3,352,595 | A | * | 11/1967 | Bezlaj | B60P 7/14 |
| | | | | | 410/139 |
| D257,340 | S | * | 10/1980 | Grossman | D3/905 |
| D259,413 | S | * | 6/1981 | Rehkopf | 224/404 |
| 4,288,011 | A | * | 9/1981 | Grossman | B65D 21/086 |
| | | | | | 224/404 |
| 4,436,215 | A | * | 3/1984 | Kleinert | A47B 88/975 |
| | | | | | 312/263 |
| 4,488,669 | A | * | 12/1984 | Waters | B60R 11/06 |
| | | | | | 224/404 |
| 4,674,665 | A | * | 6/1987 | Van Kirk | B60R 11/06 |
| | | | | | 206/349 |
| 4,881,673 | A | * | 11/1989 | Kapp | B60R 5/006 |
| | | | | | 224/311 |

(Continued)

*Primary Examiner* — Justin M Larson
(74) *Attorney, Agent, or Firm* — Camille A. Wilson; Wilson Dutra, PLLC

(57) ABSTRACT

The present disclosure provides generally for a system, method, device for more effectively storing and accessing contents in a truck bed. According to the present disclosure, a storage apparatus may comprise a lid and a container. Sub-containers may be integrated into the container, which may allow for customization and organization within the container. The system may comprise a locking mechanism, allowing for convenient access to the container, such as based on relative location of the locking mechanism, through remote control, or both. A storage apparatus may be configurable based on user needs and preferences. Remote control may allow for automated configuration of the storage apparatus. The method may comprise securing the storage apparatus to the vehicle. A sub-container may comprise partitioning, temperature control, securing mechanisms, or combinations, as non-limiting examples. Where the system comprises securing locations, container side panels may allow for expansion of original dimensions to accommodate for a range of products.

20 Claims, 30 Drawing Sheets

(56) References Cited

U.S. PATENT DOCUMENTS

| | | | | |
|---|---|---|---|---|
| 4,889,253 | A * | 12/1989 | Schmulian | A45C 13/02 403/107 |
| 5,139,186 | A * | 8/1992 | Loew | B60R 11/00 224/931 |
| 5,411,355 | A * | 5/1995 | Gosnell | B60P 7/14 410/139 |
| 5,601,206 | A * | 2/1997 | Haas | B60R 9/00 220/264 |
| 5,634,577 | A * | 6/1997 | Pearson, Jr. | B60R 11/06 224/403 |
| 5,769,294 | A * | 6/1998 | Heinz | B60R 7/02 224/927 |
| D400,159 | S * | 10/1998 | Niemi | D12/423 |
| 5,848,744 | A * | 12/1998 | Dischner | B60R 11/06 224/527 |
| D403,654 | S * | 1/1999 | Houry | D12/414.1 |
| 5,924,615 | A * | 7/1999 | McGarrah | B60R 9/00 224/404 |
| D436,342 | S * | 1/2001 | Lopez | D12/414.1 |
| 6,170,723 | B1 * | 1/2001 | Howell | B60R 9/00 220/259.2 |
| 6,234,559 | B1 * | 5/2001 | Block | B60J 7/1621 296/100.06 |
| 6,276,735 | B1 * | 8/2001 | Champion | B60R 11/06 296/100.1 |
| 6,571,949 | B2 * | 6/2003 | Burrus, IV | B60R 9/00 224/404 |
| 6,596,941 | B2 * | 7/2003 | Tripoli | B60R 11/02 307/151 |
| 6,749,241 | B1 * | 6/2004 | Erlandsson | B60R 7/02 410/129 |
| 6,935,601 | B2 * | 8/2005 | Tanaka | B60R 7/02 224/927 |
| 6,942,270 | B1 * | 9/2005 | Mulvihill | B60R 7/02 224/543 |
| 6,974,170 | B2 * | 12/2005 | Mulvihill | B60P 7/14 224/42.33 |
| D611,252 | S * | 3/2010 | Fiscus | D3/294 |
| 7,681,746 | B2 * | 3/2010 | Schmidt | A47F 5/005 211/184 |
| 7,758,092 | B2 * | 7/2010 | Kolpasky | B60R 5/045 296/37.6 |
| D626,061 | S * | 10/2010 | Giddens | D12/414.1 |
| D637,138 | S * | 5/2011 | Ehrat | D12/413 |
| D645,341 | S * | 9/2011 | Bhattacharya | D9/430 |
| 8,281,967 | B2 * | 10/2012 | Evans | B60R 9/00 224/543 |
| D679,906 | S * | 4/2013 | Gros | D3/273 |
| 8,931,987 | B2 * | 1/2015 | Hibbard | B60P 7/135 410/121 |
| 9,421,916 | B1 * | 8/2016 | Dyle | B60R 7/04 |
| D766,810 | S * | 9/2016 | Haun | D12/414.1 |
| 9,827,916 | B1 * | 11/2017 | Singer | B60P 1/6427 |
| D805,303 | S * | 12/2017 | Jacob | D3/323 |
| D806,395 | S * | 1/2018 | Jacob | D3/273 |
| D812,542 | S * | 3/2018 | LaPant | D12/218 |
| 9,956,996 | B2 * | 5/2018 | Astrike | B60R 5/042 |
| 10,029,618 | B2 * | 7/2018 | Perez Astudillo | B60R 5/048 |
| 10,112,581 | B2 * | 10/2018 | Fernando | B60R 25/241 |
| 10,232,794 | B1 * | 3/2019 | Moore | B60R 11/06 |
| 10,286,543 | B2 * | 5/2019 | Haun | B60R 9/06 |
| 10,479,290 | B2 * | 11/2019 | Simard | B60R 7/06 |
| 10,793,078 | B2 * | 10/2020 | Schuling | B60R 9/065 |
| 10,869,562 | B1 * | 12/2020 | Bryan | A47B 57/583 |
| 11,007,949 | B2 * | 5/2021 | Singer | B60P 3/42 |
| 11,059,433 | B2 * | 7/2021 | Allan | B60R 3/02 |
| D929,127 | S * | 8/2021 | Ding | D3/273 |
| D931,603 | S * | 9/2021 | Ding | D3/273 |
| 11,125,490 | B2 * | 9/2021 | Gatter | A47B 88/975 |
| D946,571 | S * | 3/2022 | Garipov | D14/358 |
| 2003/0034664 | A1 * | 2/2003 | Wayne | B60R 11/06 410/142 |
| 2004/0158968 | A1 * | 8/2004 | Jones | C10G 27/10 29/530 |
| 2011/0121045 | A1 * | 5/2011 | Agerton | B60R 11/06 224/546 |
| 2012/0261450 | A1 * | 10/2012 | Moore | B25H 3/02 224/404 |
| 2013/0284780 | A1 * | 10/2013 | Beckwith | B60R 7/14 224/401 |
| 2015/0008734 | A1 * | 1/2015 | Ishida | F02N 11/0825 307/10.1 |
| 2016/0009232 | A1 * | 1/2016 | Budny | B60R 11/06 29/729 |
| 2016/0167718 | A1 * | 6/2016 | Wilson | B62D 33/0207 224/404 |
| 2019/0111854 | A1 * | 4/2019 | Abel-Bey | E05F 15/73 |
| 2019/0275926 | A1 * | 9/2019 | Wang | H02J 7/0068 |
| 2020/0156548 | A1 * | 5/2020 | Weiss | B60R 5/003 |
| 2020/0223349 | A1 * | 7/2020 | Zanca | B60P 3/20 |
| 2020/0406730 | A1 * | 12/2020 | Fournier | B60J 7/1607 |
| 2021/0062581 | A1 * | 3/2021 | Allan | E06C 5/44 |
| 2021/0155166 | A1 * | 5/2021 | Singer | B60R 9/065 |
| 2021/0285266 | A1 * | 9/2021 | Carter | B60J 7/198 |

* cited by examiner

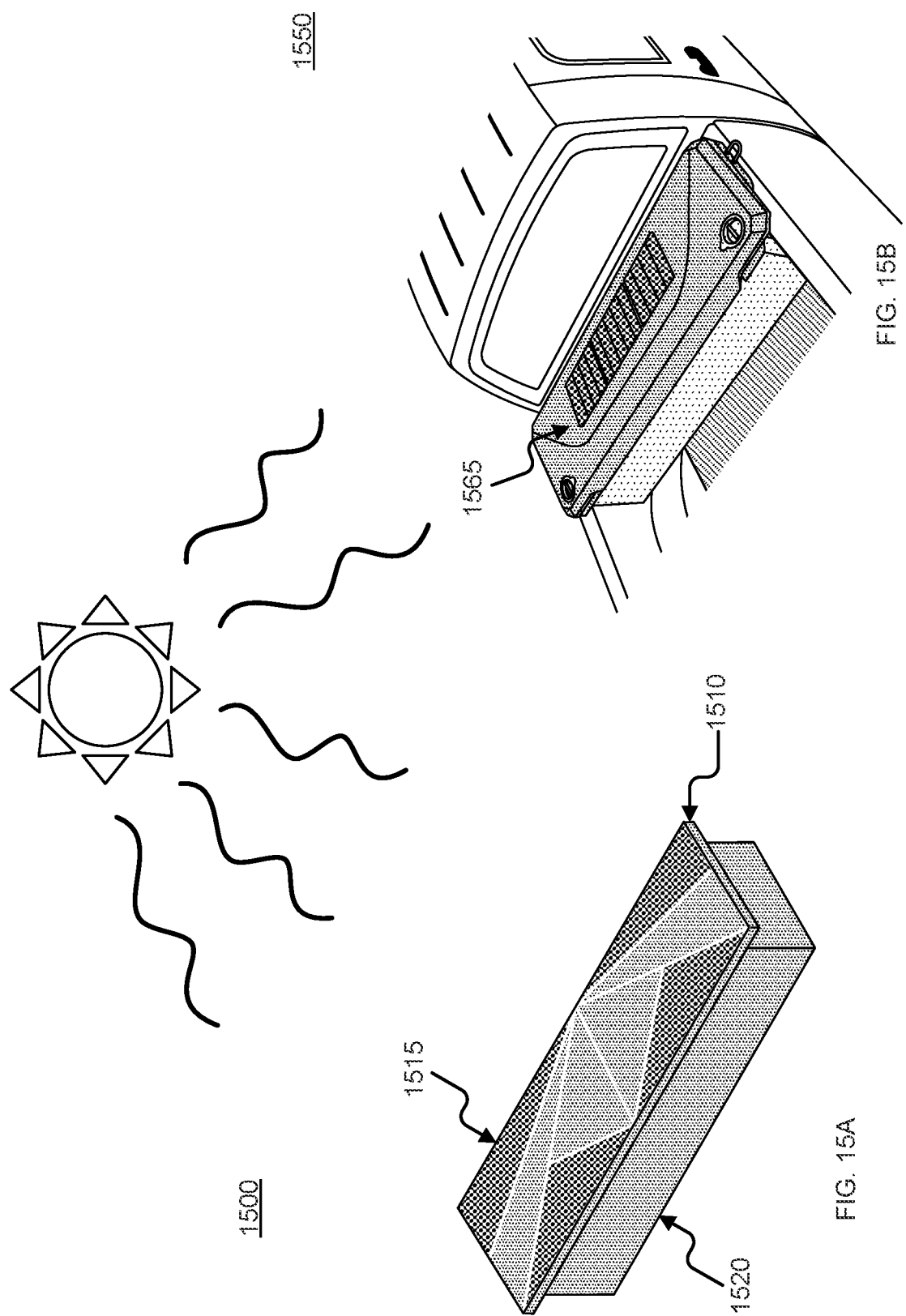

VEHICLE STORAGE APPARATUS AND SYSTEM

CROSS-REFERENCE TO RELATED APPLICATION

This application claims priority to and the full benefit of U.S. Provisional Patent Application Ser. No. 63/085,923, filed Sep. 30, 2020, and titled "TRUCK TOOLBOX APPARATUS AND SYSTEM", the entire contents of which are incorporated in this application by reference.

BACKGROUND

The trunk is typically a vehicle's main storage or cargo compartment. While in the $17^{th}$ century this was originally located at the side of a stagecoach, by the $19^{th}$ century this trunk location shifted depending on where the vehicle's engine was located. The use of the trunk has evolved over time, being used to accommodate passenger materials such as luggage to emergency supplies like a spare tire or emergency aid kit. By 1950, the manufacturer Ford introduced a trigger catch to allow for one-hand lifting, increasing the convenience of using a trunk for a vehicle's users. As vehicle design evolved, so did the types of vehicles, such as trucks.

Originally, trucks were developed to aid in industry and logistics, with multiple classifications for different truck types. Compared to smaller cars, trucks allowed companies to move equipment and materials. Trucks launched efficiency in many industries, such as farming, delivery services, and construction. Additionally, trucks allowed for portable servicing where a service provider could visit work sites with the necessary materials and equipment.

As trucks have evolved, so have its drivers. Motivations for owning a truck vary today. Some may drive a truck based on storage and transportation needs, such as for a construction company, an installation company, or delivery company. Some may drive a truck based on terrain, such as driving through mud, rocks, construction sites, or inclines. Within the last few decades, trucks have gained popularity for those who simply like trucks, expanding beyond commercial drivers. For example, the pickup truck is a popular vehicle for those who like to complement usability with off-road capabilities.

Generally, trucks are highly customizable, including options for lift, tires, truck bed capacity, and passenger capacity. Many truck drivers customize their trucks to their exact needs and preferences. Truck drivers typically purchase toolboxes for their vehicles, which is typically defined as a box that fits into a truck bed. Traditionally, toolboxes are built with a generic design that includes an open container encapsulated by a lid secured by a lock and key. This lack of diversity in composition limits the potential functionality of the toolbox. The manufacturers offer little customization and the usability of the space within the container is limited to the intended storage of tools and similar materials. Despite the form factor of a truck allowing for different storage variations, owners are normally limited to toolboxes if they want a compartmentalized space to store their belongings.

As a result, there is a lack of variability in design and functionality limits the growing needs of the increasingly diverse consumer population. Owners of larger vehicles, particularly those with an open storage space like in a truck, may need something beyond the standard storage box to meet their needs. A person's needs may shift depending on what a person wants to do, and the current market options need to be able to adjust to those changing wants.

SUMMARY OF THE DISCLOSURE

Therefore, what is needed is a variable, configurable, or adaptable system, method, and device for storing and accessing contents in a vehicle, particularly a truck bed. Many drivers have professional roles where the rugged and rudimentary design of the standard toolbox does not address their needs. Generally, a storage apparatus is provided that may comprise a lid and a container. According to the present disclosure, the device may comprise a storage apparatus that may cater to the unique needs of each driver or driver type.

In some aspects, sub-containers may be integrated into the container, which may allow for customization and organization within the container. In some implementations, the interior of the container may comprise padding that may be removeable. In some embodiments, the interior of a container may include additional embedded locations for storing objects. In some implementations, the system may comprise a locking mechanism, which may allow for convenient access to the container, such as based on relative location of the locking mechanism, through remote control, or both. In some aspects, a storage apparatus may be configurable based on user needs and preferences. In some embodiments, remote control may allow for automated configuration of the storage apparatus.

A method of use may comprise securing the storage apparatus to the vehicle. In some embodiments, a sub-container may comprise partitioning, temperature control, securing mechanisms, or combinations, as non-limiting examples. Where the system comprises securing locations, container side panels may allow for expansion of original dimensions to accommodate for a range of products.

The present disclosure relates to a storage apparatus configured to fit within a rear portion of a vehicle. In some embodiments, the storage apparatus may include a container comprising a base, at least three side panels, and a substantially open top portion, where the container may comprise at least one subcomponent, and a lid configured to at least partially cover the top portion of the container.

In some implementations, the outer surface may comprise at least one type of variable surface or protruding structure. In some aspects, the at least one protruding structure may comprise at least one of a bump, a point, a ridge, a raised edge, and a raised panel. In some embodiments, the lid may comprise an inner surface that may comprise at least one reinforcing mechanism. In some implementations, the at least one reinforcing mechanism may comprise at least one of an amount of insulating material, an amount of cooling material, a lattice structure, a supporting frame, and at least one reinforcing bar, as non-limiting examples.

In some aspects, the container may comprise four side panels; where the lid may be attached to an upper portion of the container via at least one hinge; and where an outer surface of the lid may comprise a plurality of bumps and at least two raised panels and an inner surface of the lid may comprise at least one folding rack bar. In some embodiments, the lid and the container may comprise angled corners and a front portion of the lid may comprise a substantially planar tab extending downwardly therefrom to assist a user with opening and securing the lid.

In some implementations, the at least one subcomponent may comprise at least one of a sub-container, an amount of insulating material, a storage apparatus securing device, an interior divider, a power source, a lighting mechanism, an object securing mechanism, an extension panel, an electrical port, and a securing system. In some aspects, the storage apparatus securing device may comprise at least one of a hollow cavity, a hole, an extruding anchor, a guiding rail, a rack and pinion structure, and a clamp. In some embodiments, the power source may comprise at least one of: a power storage device, a power generating device, and an energy collecting device.

In some implementations, the power storage device may comprise a battery. In some aspects, the power generating device may be configured to utilize kinetic energy generated by a rotation of at least one wheel that the vehicle uses for mobility. In some embodiments, the energy collecting device may comprise a solar panel. In some implementations, the object securing mechanism may comprise at least one of a strap, a rack, and a hook, as non-limiting examples. In some aspects, the extension panel may be configured to at least partially cover a portion of the vehicle.

In some embodiments, the securing system may comprise at least one of: a key lock, a combination lock, and an electronic locking system. In some implementations, the electronic locking system may be directed by an external signal device. In some aspects, a size of the sub-container may be adjustable. In some embodiments, two or more object securing mechanisms are stored enclosed within one or more of the at least three side panels and a single object securing mechanism may be rotated to an exposed position when directed by an external signal device.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 15A illustrates exemplary energy collecting devices connected to the lid, according to some embodiments of the present disclosure.

FIG. 15B illustrates exemplary energy collecting devices connected to the lid, according to some embodiments of the present disclosure.

DETAILED DESCRIPTION

Figure 1A:
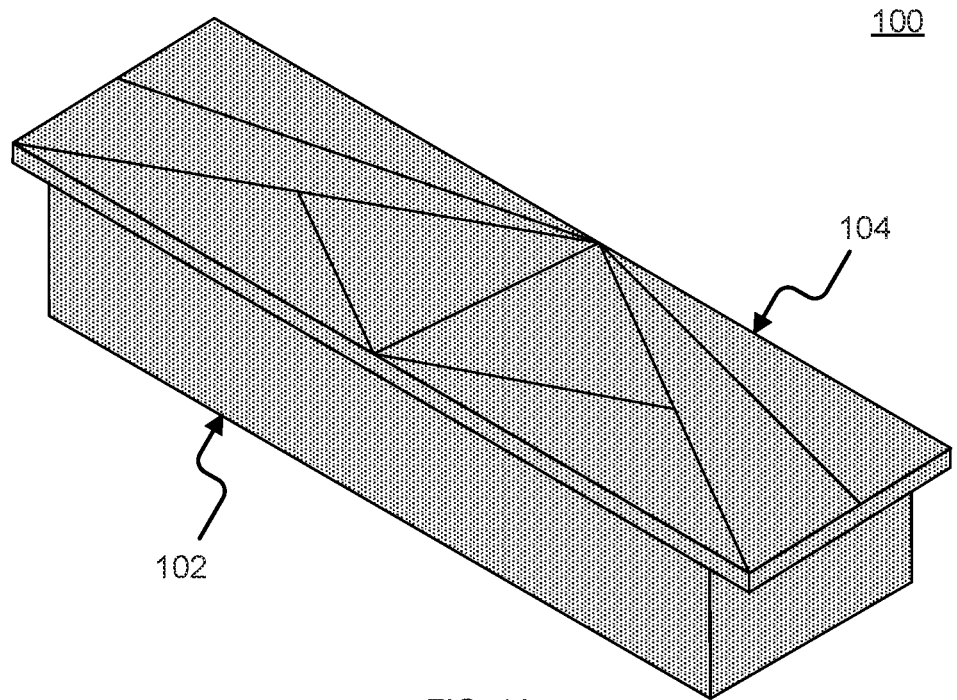
FIG. 1A illustrates an exemplary closed storage apparatus, according to some embodiments of the present disclosure.
Figure 1B:
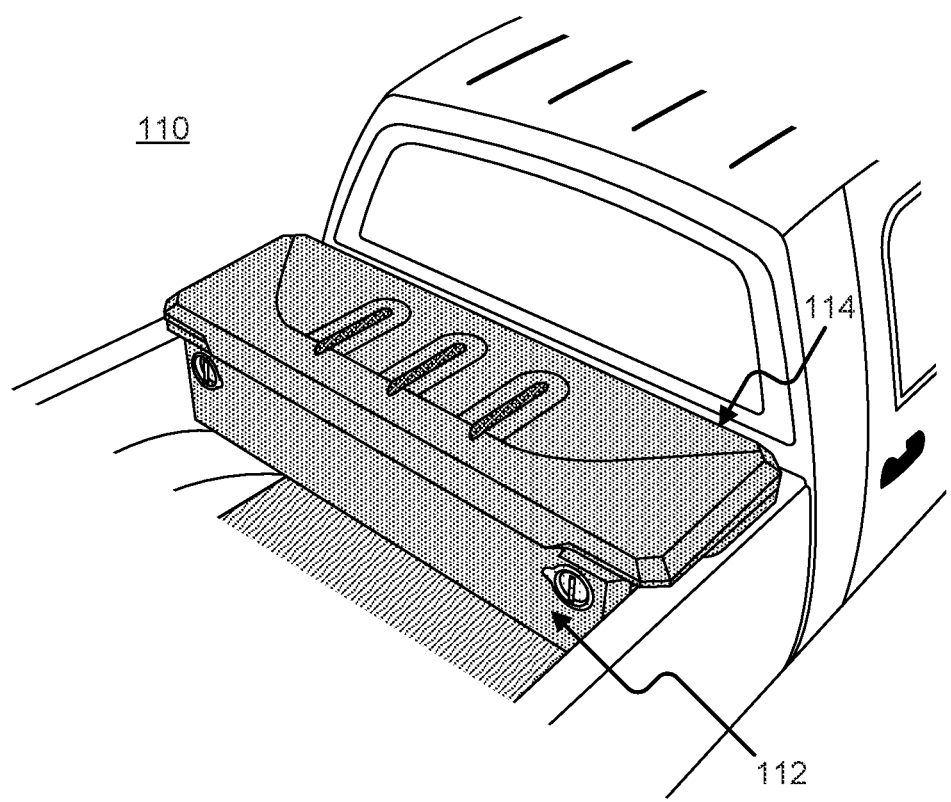
FIG. 1B illustrates an exemplary closed storage apparatus, according to some embodiments of the present disclosure.
Figure 1C:
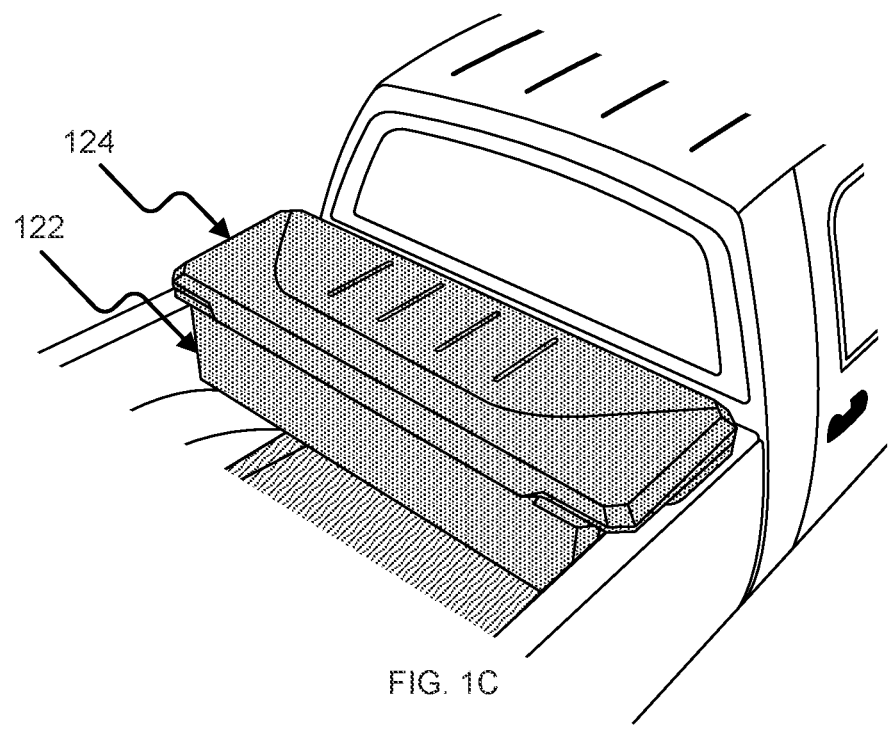
FIG. 1C illustrates an exemplary closed storage apparatus, according to some embodiments of the present disclosure.
Figure 1D:
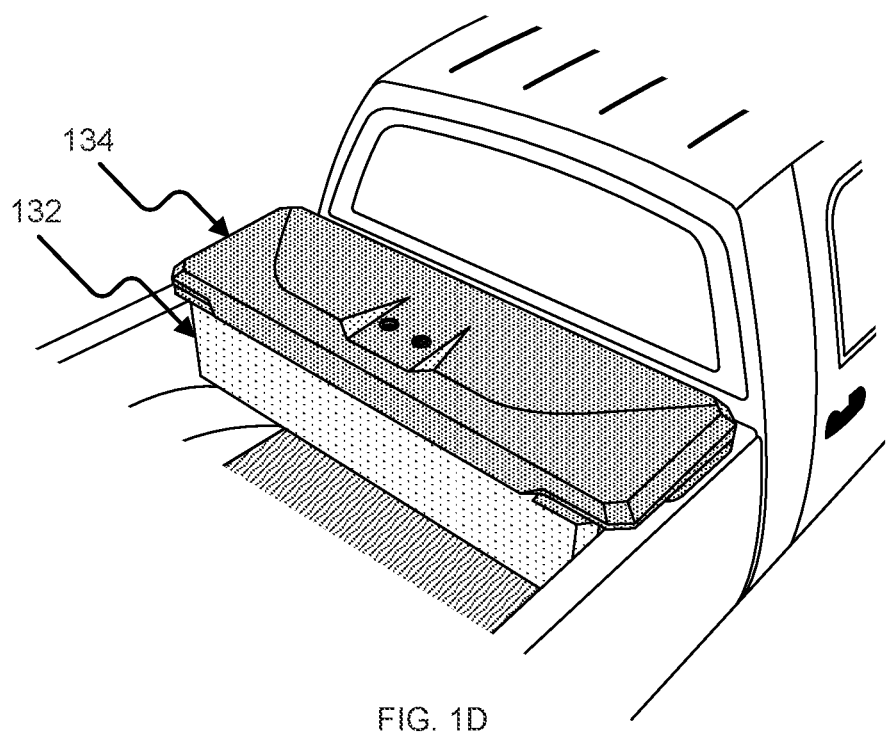
FIG. 1D illustrates an exemplary closed storage apparatus, according to some embodiments of the present disclosure.
Figure 1E:
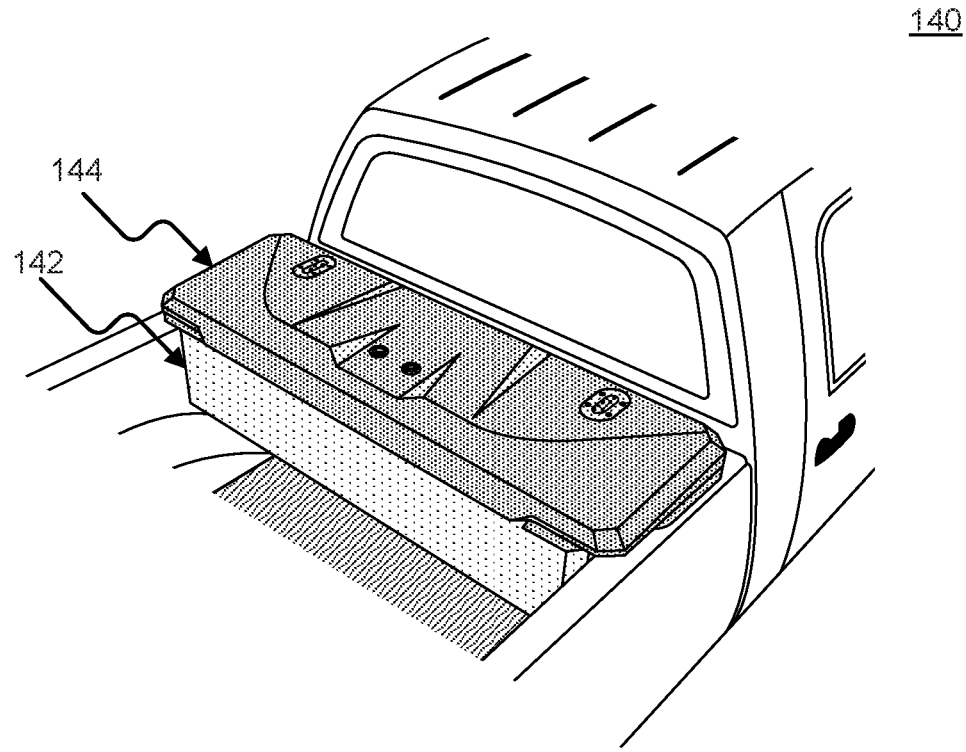
FIG. 1E illustrates an exemplary closed storage apparatus, according to some embodiments of the present disclosure.
Figure 1F:
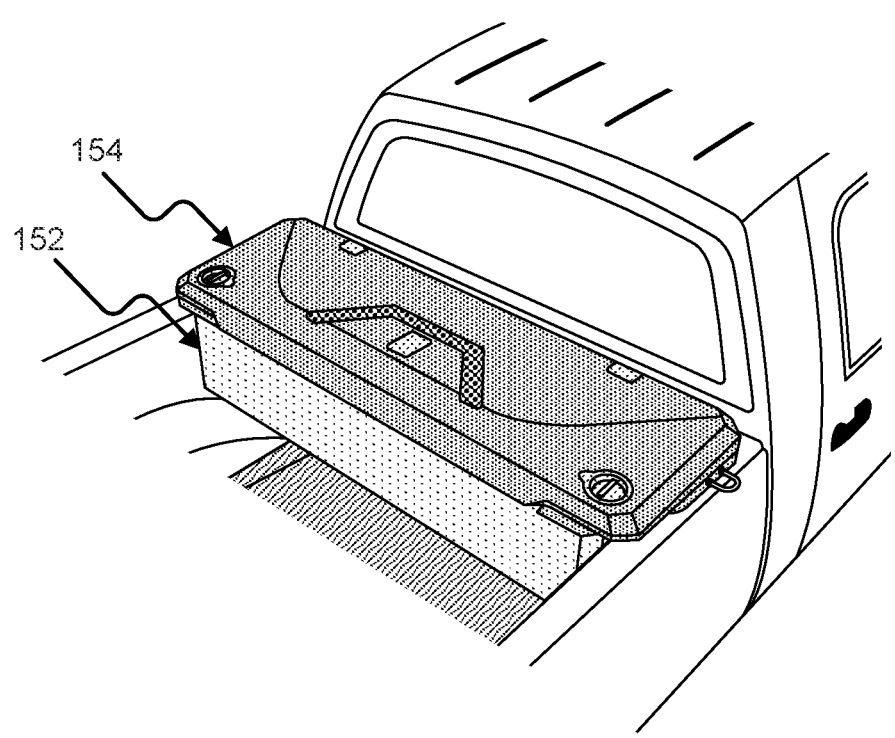
FIG. 1F illustrates an exemplary closed storage apparatus, according to some embodiments of the present disclosure.
Figure 1G:
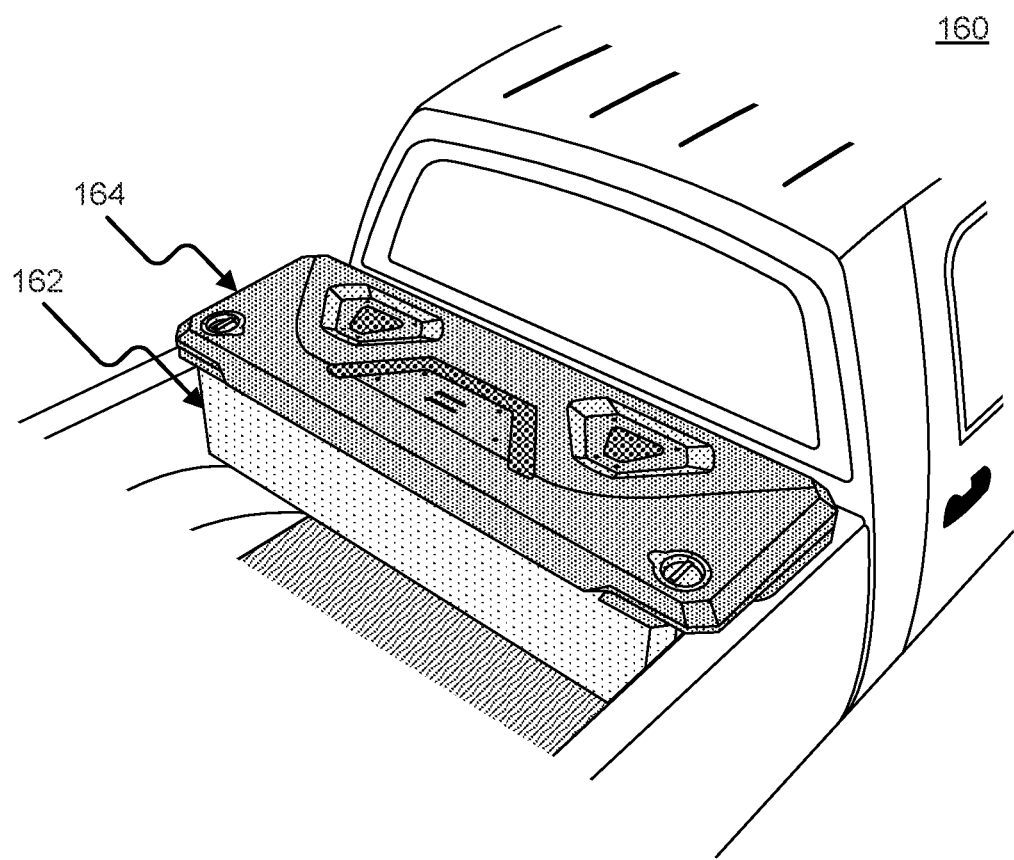
FIG. 1G illustrates an exemplary closed storage apparatus, according to some embodiments of the present disclosure.
Figure 1H:
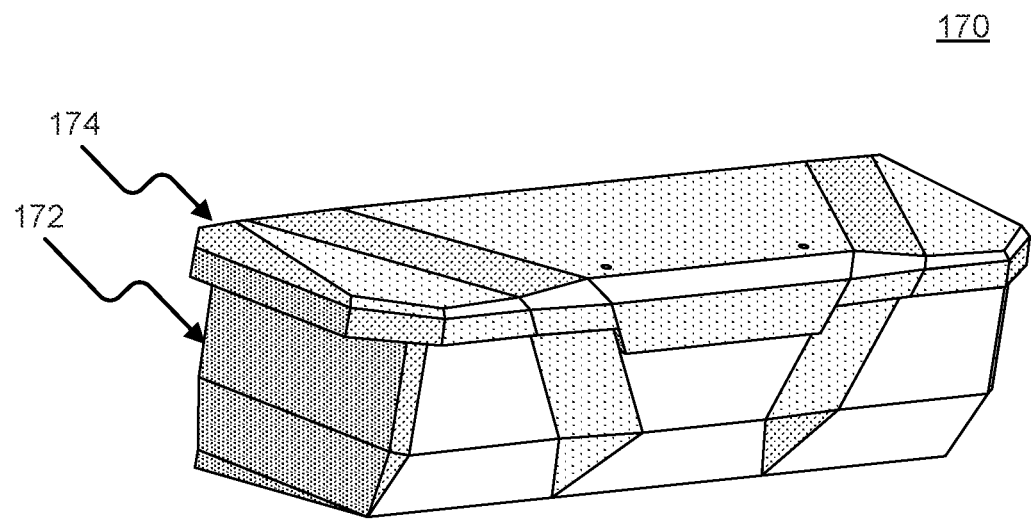
FIG. 1H illustrates an exemplary closed storage apparatus, according to some embodiments of the present disclosure.
Figure 1I:
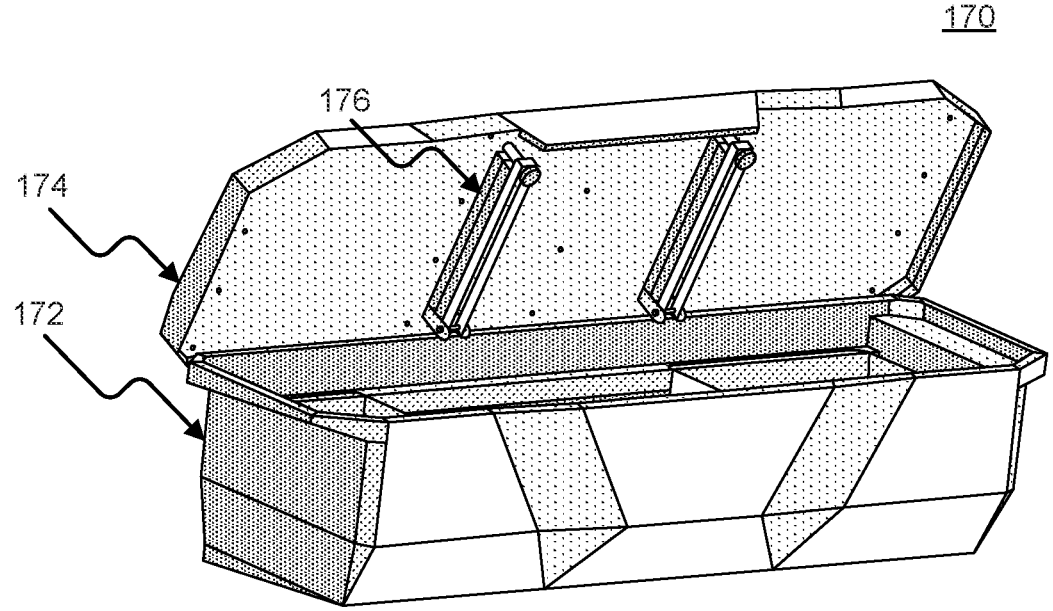
FIG. 1I illustrates an exemplary open storage apparatus, according to some embodiments of the present disclosure.

The present disclosure provides generally for systems, methods, and devices for a storage apparatus comprising of interchangeable subcomponents that are designed for specific utility. According to the present disclosure, a storage apparatus may consist of multiple subcomponents that may be included as a part of the storage apparatus for a variety of intended utility. For example, a storage apparatus may contain sub-containers with different intended uses. A sub-container may possess insulation sufficient to regulate temperature and provide protection for a laptop.

In some aspects, a sub-container may be supplied from a manufacturer. For example, a sub-container may be an insulated cooler from a vendor. In some implementations, a storage apparatus may possess external aids for movement. For example, a storage apparatus may collapse when relocated. In some embodiments, the storage apparatus may possess wheels to improve mobility. In some aspects, a storage apparatus container may contain holes intended for ease in securing the storage apparatus in a variety of positions.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Storage apparatus: as used herein refers to a container and lid designed to fit in the rear portion of a vehicle.

Container: as used herein refers to a containing portion of a storage apparatus.

Subcomponent: as used herein refers to internal or external portions of storage apparatus that provide added functionality. For example, subcomponents may comprise racks, sub-containers, or partitions, as non-limiting examples.

Referring now to FIGS. 1A-1K, an exemplary storage apparatus 100, 110, 120, 130, 140, 150, 160, 170, 180 is illustrated. The storage apparatus 100, 110, 120, 130, 140, 150, 160, 170, 180 may comprise a lid 104, 114, 124, 134, 144, 154, 164, 174, 184 and a container 102, 112, 122, 132, 142, 152, 162, 172, 182. In some aspects, the container 102, 112, 122, 132, 142, 152, 162, 172, 182 may comprise a base and at least three side panels. In some embodiments, the lid 104, 114, 124, 134, 144, 154, 164, 174, 184 may comprise a variable surface, which may increase durability and limit damage to the lid 104, 114, 124, 134, 144, 154, 164, 174, 184. By way of example and not limitation, the lid 104, 114, 124, 134, 144, 154, 164, 174, 184 may comprise an outer surface with at least one type of variable surface or protruding structure, such as a bump, point, ridge, raised edge, raised panel, or combination thereof.

In some aspects, an uneven surface may deflect contact and decrease the potential force of the object. In some implementations, the lid 104, 114, 124, 134, 144, 154, 164, 174, 184 may align flush with the surface of the container 102, 112, 122, 132, 142, 152, 162, 172, 182. The storage apparatus 110 may be reinforced with at least one reinforcement mechanism configured within an internal portion of the lid 104, 114, 124, 134, 144, 154, 164, 174, 184 or on an inner surface of the lid 104, 114, 124, 134, 144, 154, 164, 174, 184, which may allow for better protection of the lid 110 and the contents of the storage apparatus. For example, internal reinforcement of the lid 104, 114, 124, 134, 144, 154, 164, 174, 184 may insulate the storage apparatus 100, 110, 120, 130, 140, 150, 160, 170, 180 allowing for temperature control, such as through foam or cooling material. As another example, reinforcement may pair with the variable surface to further increase durability. The lid 104, 114, 124, 134, 144, 154, 164, 174, 184 may comprise a reinforcement mechanism in the form of an internal support structure, such as a lattice, frame, reinforcing bars, or combinations, as non-limiting examples.

Figure 1J:
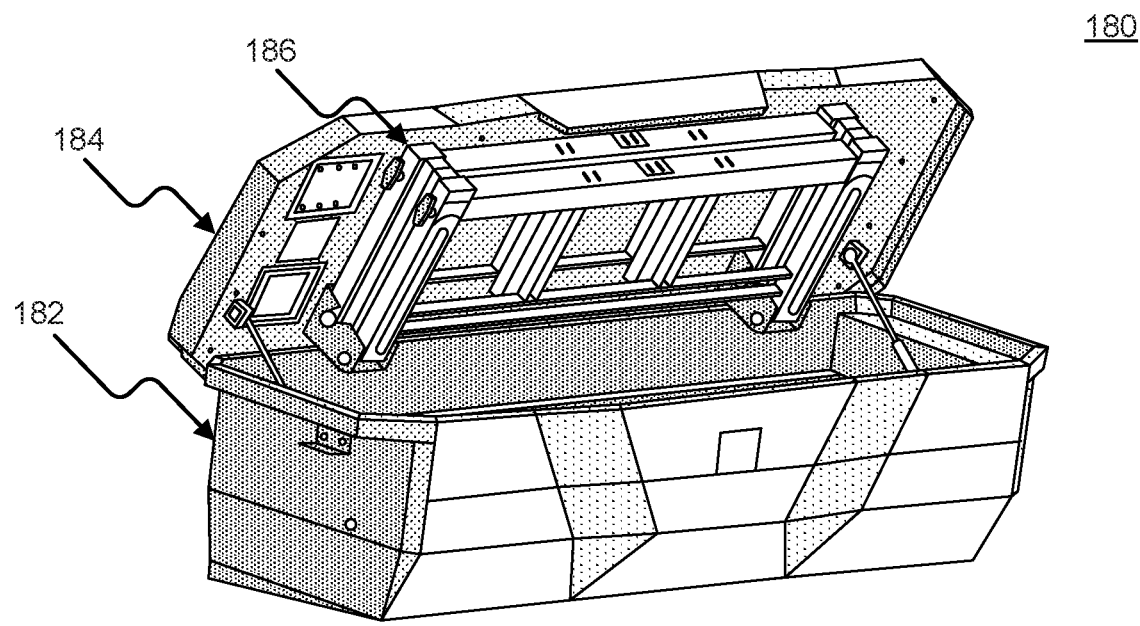
FIG. 1J illustrates an exemplary open storage apparatus, according to some embodiments of the present disclosure.
Figure 1K:
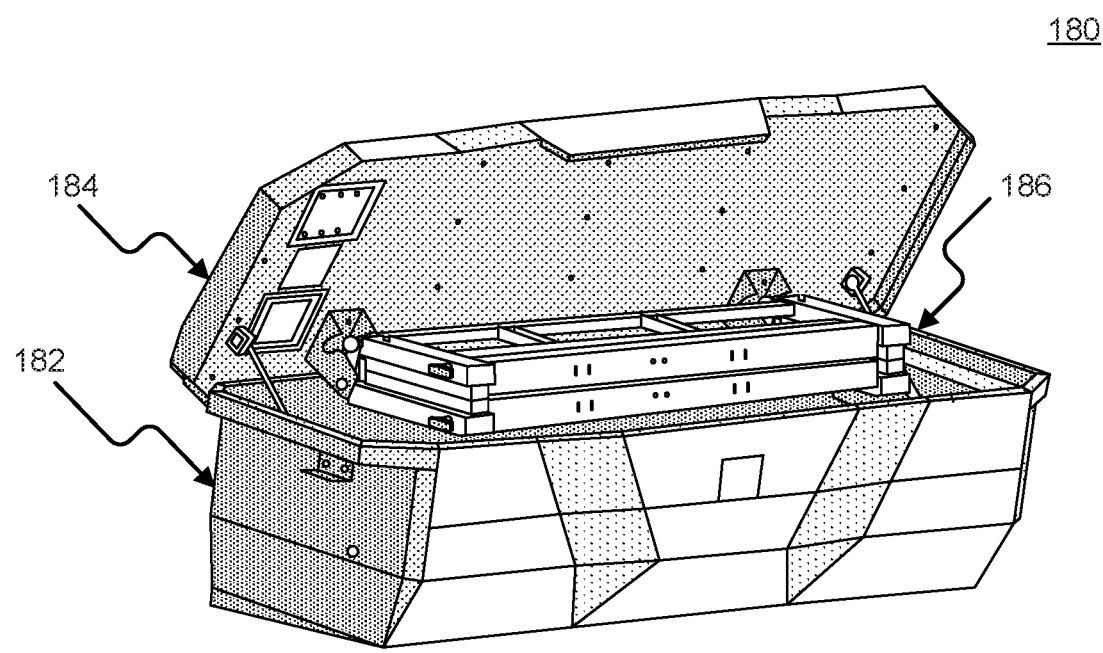
FIG. 1K illustrates an exemplary open storage apparatus, according to some embodiments of the present disclosure.

In some embodiments, storage apparatus 170, 180 may comprise four side panels and a lid 174, 184 attached to an upper portion of the container 172, 182 via at least one hinge. In some implementations, the outer surface of the lid may comprise a plurality of protruding structures in the form of bumps as well as at least two raised panels, while the inner surface of the lid 174 may comprise at least one folding rack bar 176, 186, such as for accessories. For example, as illustrated in FIGS. 1J-1K, the folding rack bar 186 may be collapsible, allowing for storage of the rack bar 186 when not in use.

Additionally, at least one of the corners of the lid 174, 184 and the container 172, 182 may be angled. In some aspects, the lid 174 may include a substantially planar tab extending downwardly from a front portion of the lid 174 to assist a user with opening and securing the lid 174. In some embodiments, the lid 174 may comprise interior insulation, which may limit heat loss or gain.

Figure 2:
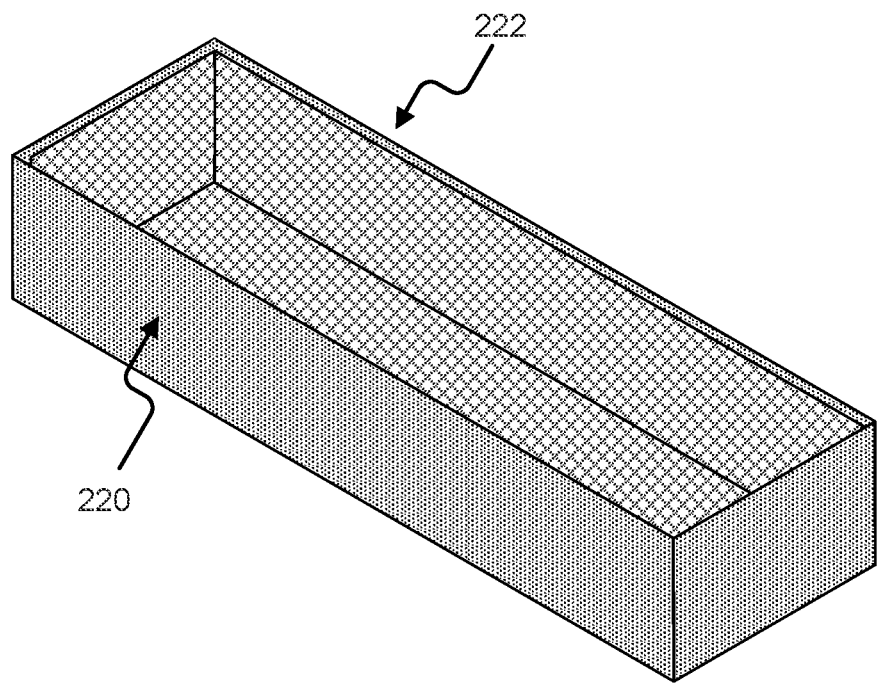
FIG. 2 illustrates an exemplary interior of the container, according to some embodiments of the present disclosure.

Referring now to FIG. 2, an exemplary interior of the container 220 is illustrated. In some implementations, the interior may contain padded insulation 221. In some embodiments, the insulation 221 may be removable from the container. In some aspects, the insulation 221 may be segmented for partial removal from the container. For example, a non-insulated segment of the container 220 may store items such as work boots or tools that may contain dirt, and an insulated segment of the container 220 may store a suit jacket and laptop, which may be fragile and clean. In some embodiments, this segment of the container 220 that may store dirty items may have the insulation 221 removed to prevent the insulation from collecting dirt.

Figure 3A:
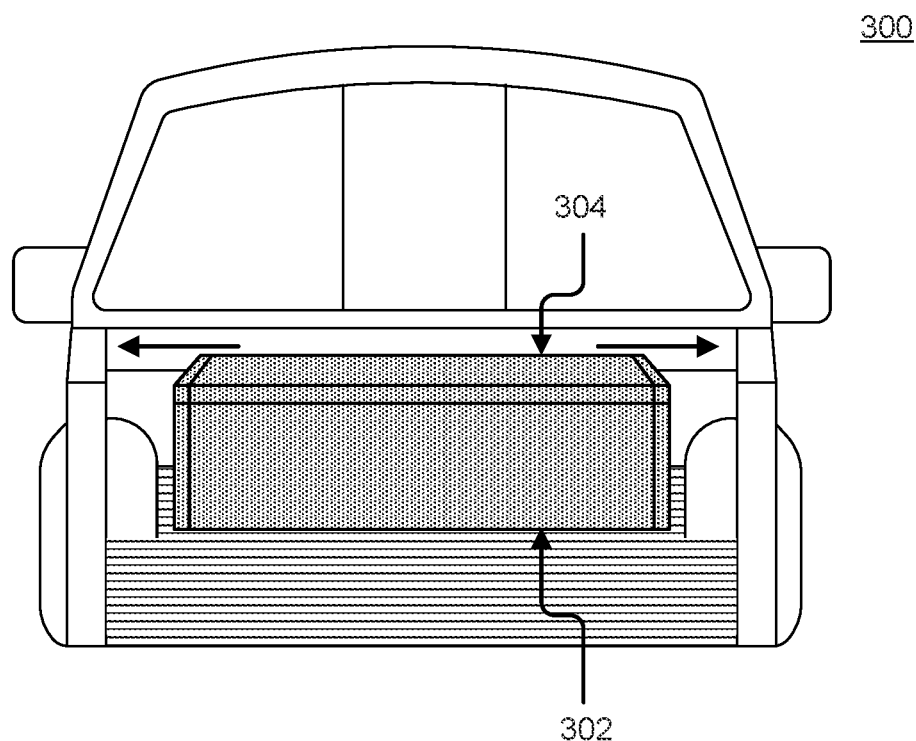
FIG. 3A illustrates an exemplary storage apparatus secured within a vehicle, according to some embodiments of the present disclosure.
Figure 3B:
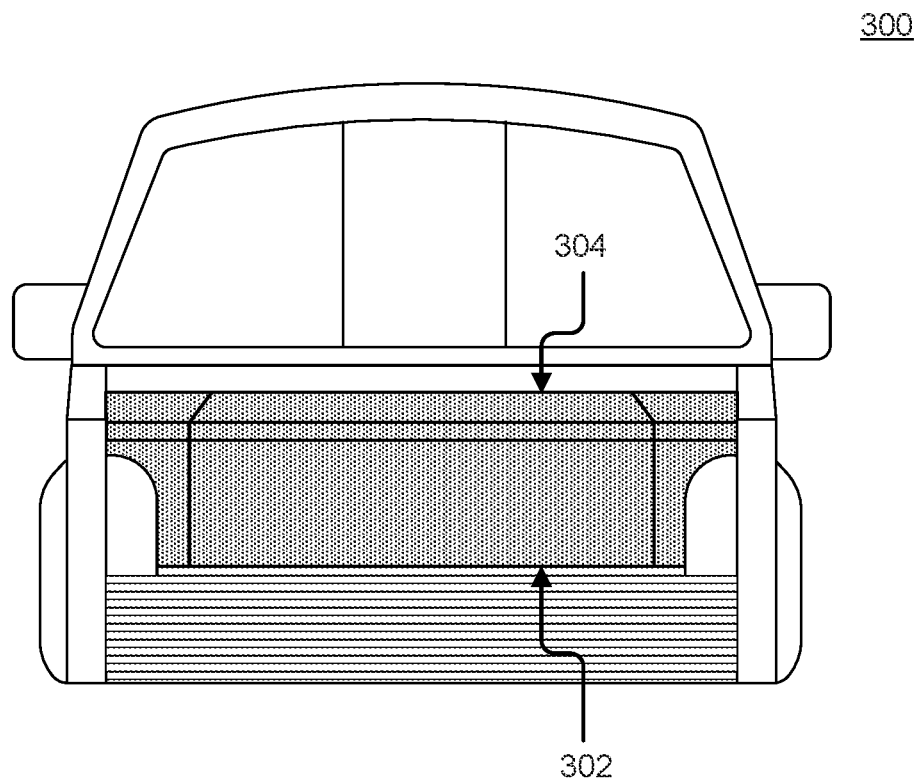
FIG. 3B illustrates an exemplary storage apparatus secured within a vehicle, according to some embodiments of the present disclosure.

Referring now to FIG. 3A, an exemplary fitted storage apparatus 300 placed within the rear of a vehicle is illustrated. In some aspects, a fitted storage apparatus 300 may possess geometric parameters that differ from the intended placement within the vehicle. Referring now to FIG. 3B, an exemplary storage apparatus fitted to the vehicle is illustrated. In some embodiments, the fitted storage apparatus 300 may expand to meet the dimensions of the desired installation location within the vehicle, such as, for example and not limitation, by adjusting one or more of the side panels. In some aspects, the side panels may alter shape in a manner to fit over extruded features within the vehicle such as wheel wells, as a non-limiting example. In some implementations, the fitted storage apparatus 300 may be oriented at any depth of the vehicle. For example, the fitted storage apparatus 300 may be secured at the innermost face of a truck bed and could be relocated to the outermost edge of the truck bed.

In some implementation, the fitted storage apparatus 300 may be attached to the vehicle by means of an external storage apparatus securing device. For example, a clamp may apply pressure between the storage apparatus and both sides of the vehicle. In some aspects, the external storage apparatus securing device may contain components that are integrated with the structure of the container 302. In some embodiments, the fitted storage apparatus 300 may possess a rack and pinion structure that, controlled by a central knob, would extend stabilizing bars horizontally until adequate force was applied to the sides of the vehicle to reduce movement of the fitted storage apparatus 300.

Figure 3C:
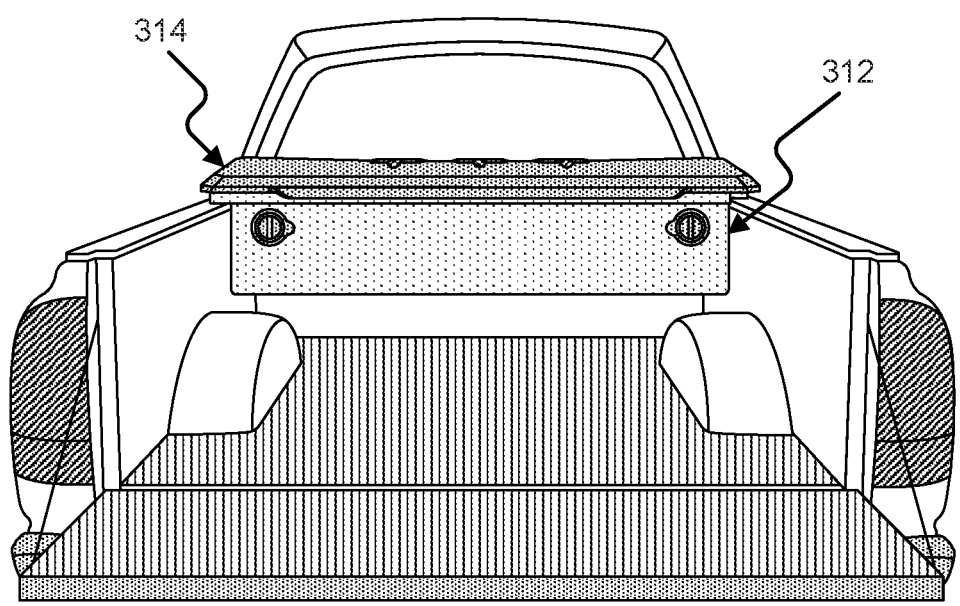
FIG. 3C illustrates an exemplary storage apparatus secured within a vehicle, according to some embodiments of the present disclosure.

Referring now to FIG. 3C, an exemplary floating storage apparatus 310 installed on a truck bed is illustrated. In some aspects, a floating storage apparatus 310 may fit over the edges of a truck bed, which may allow for use with a range of widths of truck beds. In some embodiments, a floating storage apparatus container 312 may not sit on the floor of a truck bed, which may allow for extended storage of objects within the truck bed.

In some implementations, the storage apparatus 300 may possess storage apparatus securing devices in the form of hollow cavities, holes, extruded anchors, as a non-limiting list, that may be utilized with additional securing devices to secure the storage apparatus 300 within the vehicle. In some aspects, an external storage apparatus securing device may provide a securing interface between the storage apparatus and the vehicle. For example, a guiding rail may be attached to the vehicle that allows the storage apparatus to be secured in a variety of locations within the vehicle based upon location on the guiding rail.

Figure 4A:
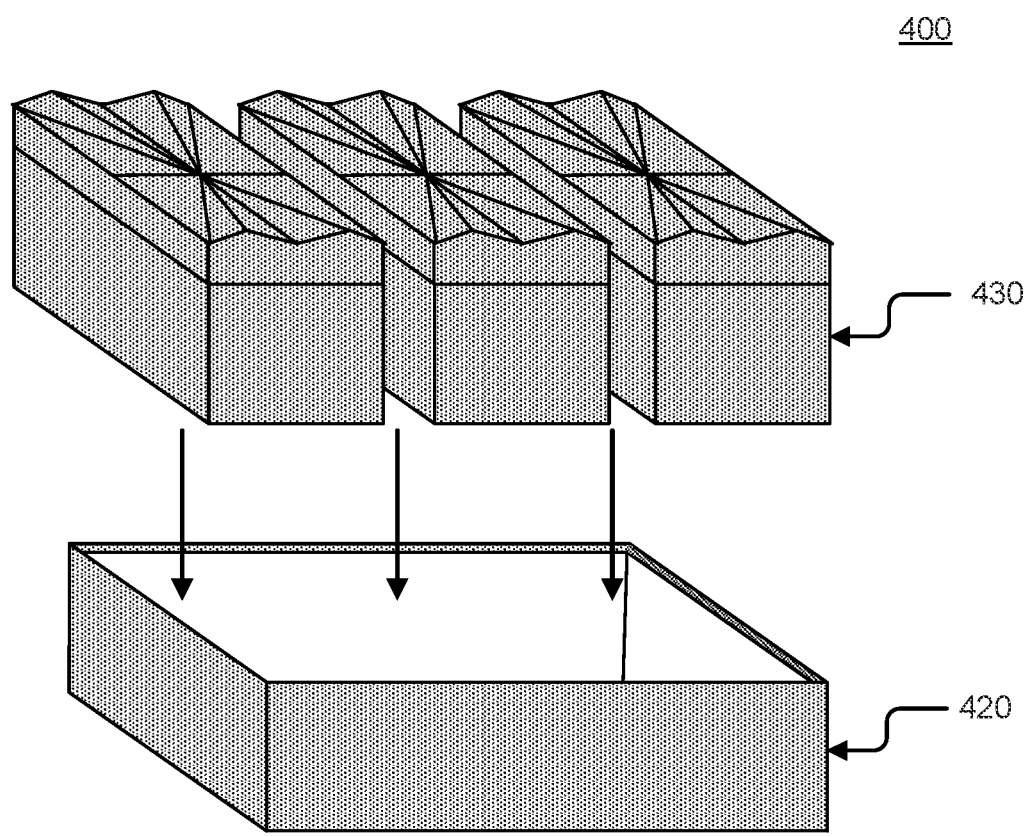
FIG. 4A illustrates exemplary sub-containers within a storage apparatus, according to some embodiments of the present disclosure.

Referring now to FIG. 4A, an exemplary storage apparatus 400 comprising a container 420 with multiple sub-containers 430 is illustrated. In some embodiments, the sub-containers may possess separate lids that create the collective lid 410 of the storage apparatus 400. In some implementations, the lid 410 may be segmented to allow for partial opening. In some aspects, a device controlling which sections of the lid 410 may open simultaneously may exist for the user to select which sections of the lid 410 may open. In some embodiments, the sub-containers 430 may possess separate lids and the storage apparatus 400 may possess a lid 410 that covers all sub-container lids.

Figure 4B:
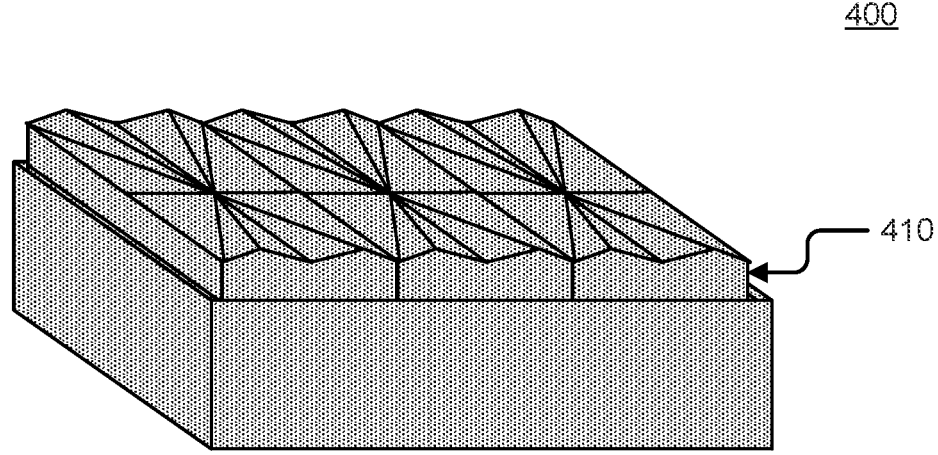
FIG. 4B illustrates exemplary sub-containers within a storage apparatus, according to some embodiments of the present disclosure.

In some aspects, a lid 410 that may cover the sub-containers may allow for a reinforced and strong exterior without requiring each sub-container to comprise a lid with the same durability. Referring now to FIG. 4B, the sub-containers 430 may vary in size and quantity. For example, some sub-containers 430 may be sized to fit smaller objects such as a purse and may be positioned alongside a sub-container 430 that may be larger to allow for the placement of larger objects such as work clothing. In some implementations, a lid 410 may connect the sub-containers 430, which may secure the sub-containers 430 within the container 420.

Figure 5:
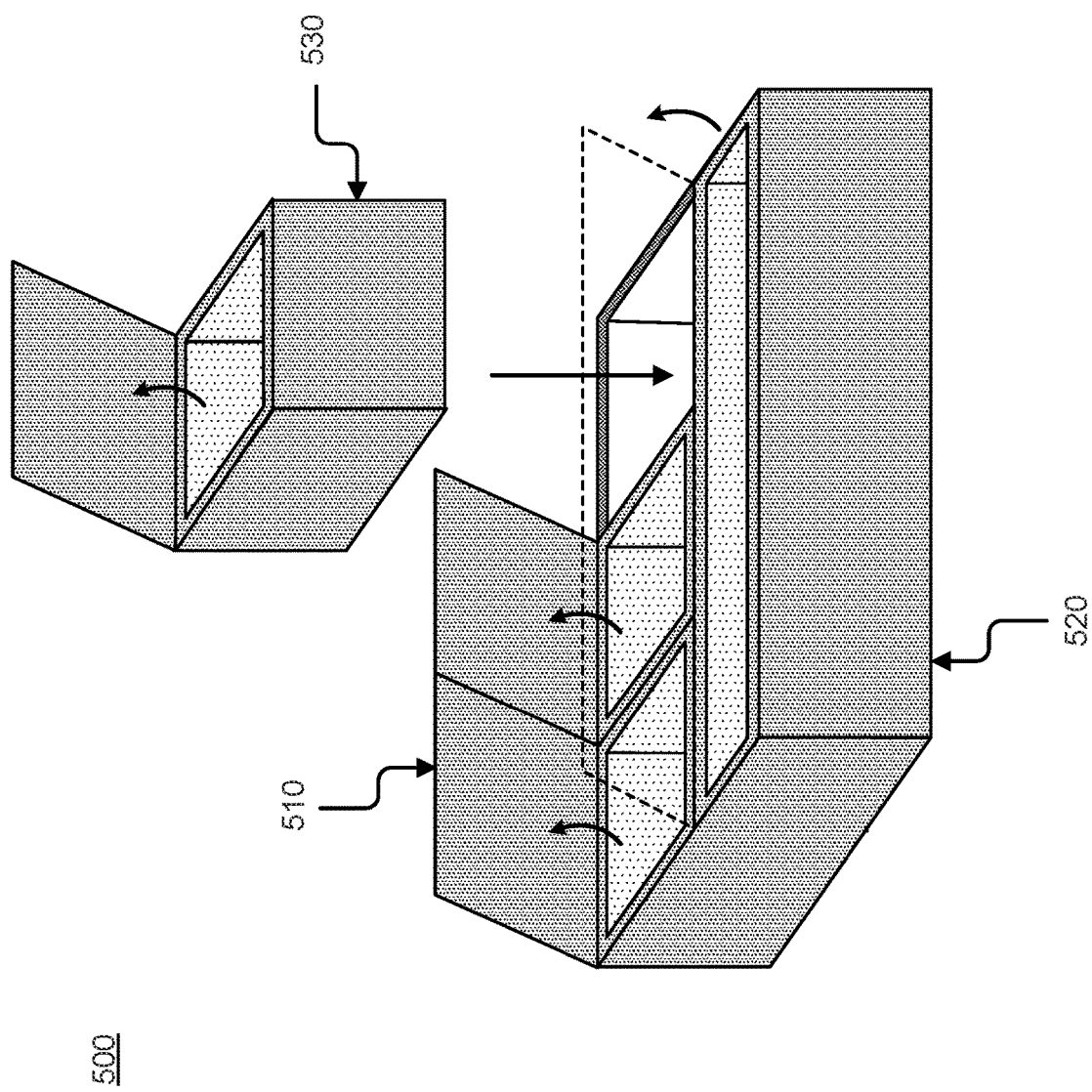
FIG. 5 illustrates exemplary sub-containers within a storage apparatus, according to some embodiments of the present disclosure, according to some embodiments of the present disclosure.

Referring now to FIG. 5, an exemplary storage apparatus 500 comprising a number of sub-containers 530 is illustrated. In some aspects, sub-containers 530 may differ in size, wherein sub-containers 530 may be mixed and match to fit into the container 520. This may allow a user to customize the container 530 to their needs and preferences. For example, where a user may transport multiple files, the user may configure the sub-containers 520 to accept file folders. In some embodiments, the sub-containers 530 may possess separate lids 510.

In some embodiments, the lid 510 may comprise a container lid 510 with sub-container lids that operate as two separate layers of lid. In some implementations, the container lid 510 may comprise the sub-container lids. In some aspects, the sub-containers 530 may utilize the container lid. For example, the sub-containers 530 may occupy a portion of the container 520 volume and the container lid 510 may cover the sub-containers 530 and the remaining volume within the container 520.

Figure 6A:
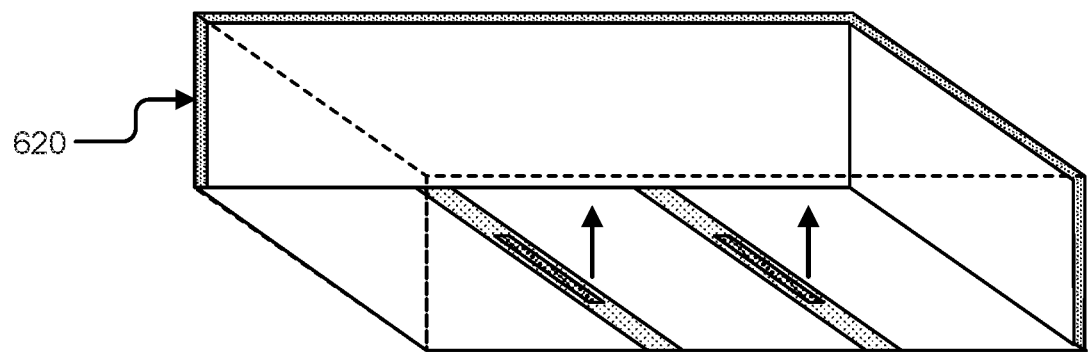
FIG. 6A illustrates exemplary interior dividers within the storage apparatus, according to some embodiments of the present disclosure.

Referring now to FIG. 6A, an exemplary interior divider 640 is illustrated. In some embodiments, the storage apparatus 600 may comprise a container 620 divided by interior dividers 640. In some implementations, the interior dividers 640 may extend to a predetermined height. In some aspects, the interior dividers 640 may be complemented by additional interior dividers that may be perpendicular to the illustrated divider orientation, which may allow for customization of interior organization.

Figure 6B:
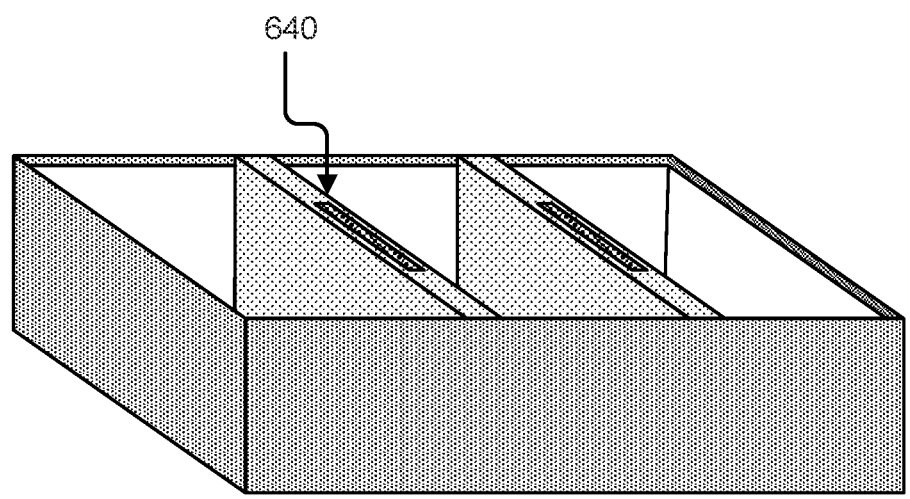
FIG. 6B illustrates exemplary interior dividers within the storage apparatus, according to some embodiments of the present disclosure.

Referring now to FIG. 6B, an exemplary interior divider 640 is illustrated. In some embodiments, the interior dividers 640 may extend to the full height of the container 620. In some aspects, a container 620 may comprise a number of interior dividers configured in a number of locations within the interior 622 of the container 620 to allow for a variety of segmented space orientations.

In some embodiments, the interior dividers 640 may be adjusted by height utilizing an external positioning mechanism. For example, an interior divider 640 may alter height by sliding along attached guiding rails and may be secured at a height by a pin, as a non-limiting example. In another example, an interior divider may be adjusted between predetermined heights using an external securing mechanism such as, but not limited to, an extruded spring-based pin that may be depressed for adjustment and extends into a depression or cavity at an intended height.

Figure 7A:
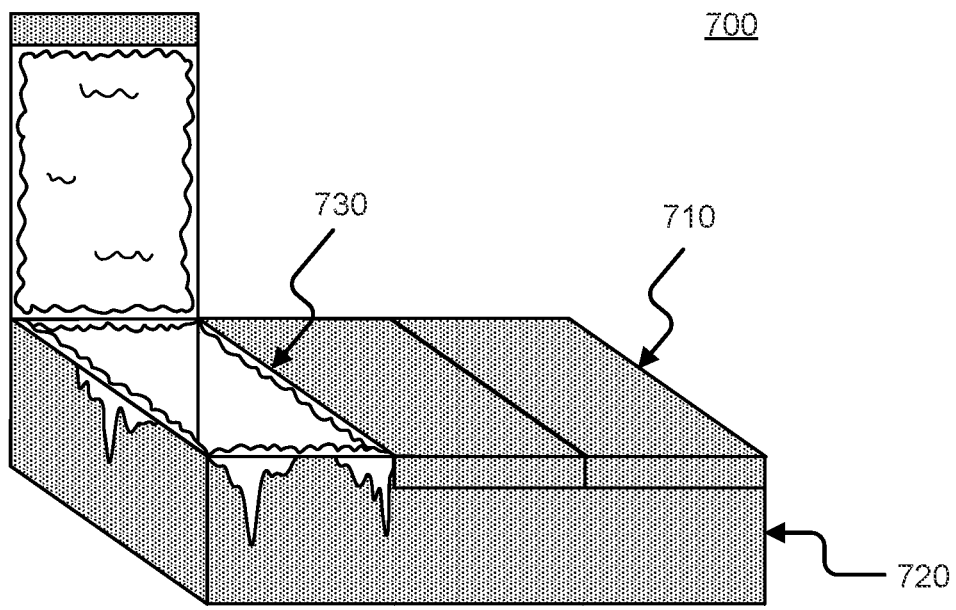
FIG. 7A illustrates exemplary sub-containers within the storage apparatus, according to some embodiments of the present disclosure.

Referring now to FIG. 7A, an exemplary sub-container 730 with temperature control is illustrated. In some implementations, the sub-container 730 may be designed to maintain predefined temperatures that may differ from ambient temperature. For example, a cooler may be integrated with the storage apparatus 700 to store items with the purpose of maintaining an intended temperature. In some aspects, a third-party vendor may supply a sub-container 730 or may provide a secondary container that may fit into a sub-container 730. For example, a grocery store may provide a reusable grocery bag that may fit into a sub-container 730. As another example, a beverage store may provide segmenting panels that may be inserted into a sub-container 730, which may secure glass bottles within the sub-container.

Figure 7B:
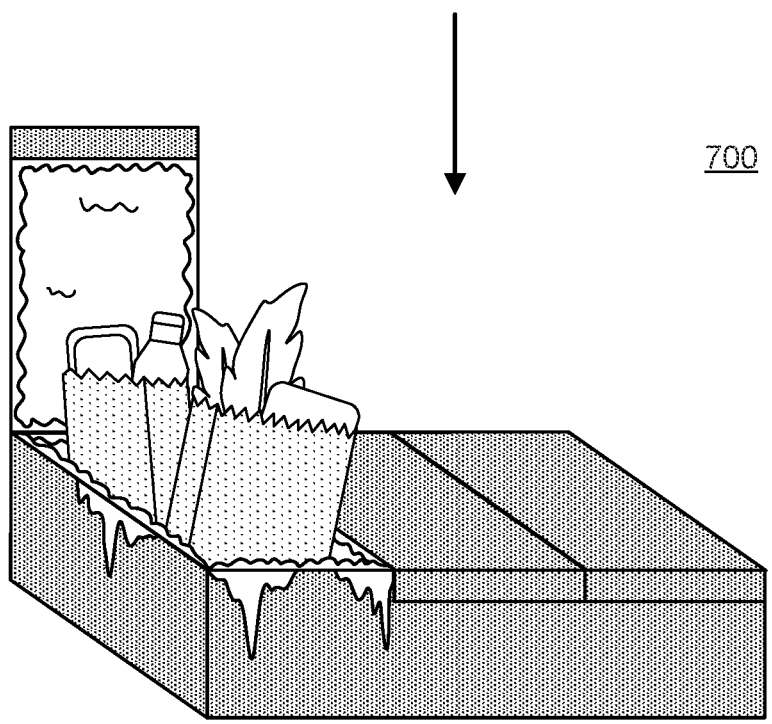
FIG. 7B illustrates exemplary sub-containers within the storage apparatus, according to some embodiments of the present disclosure.

Referring now to FIG. 7B, an example of a sub-container is illustrated. In some embodiments, the sub-container 730 may receive a power supply from an external source to perform a function. In some aspects, the power supply may receive power from a plug on the exterior of the container 720. In some implementations, the power supply may receive power from a power source embedded within the container. For example, solar panels attached to the lid 710 of the storage apparatus 700 may collect energy that charges a battery stored within the storage apparatus 700 that supplies internal power to a cooler sub-container to maintain a desired temperature.

Figure 8A:
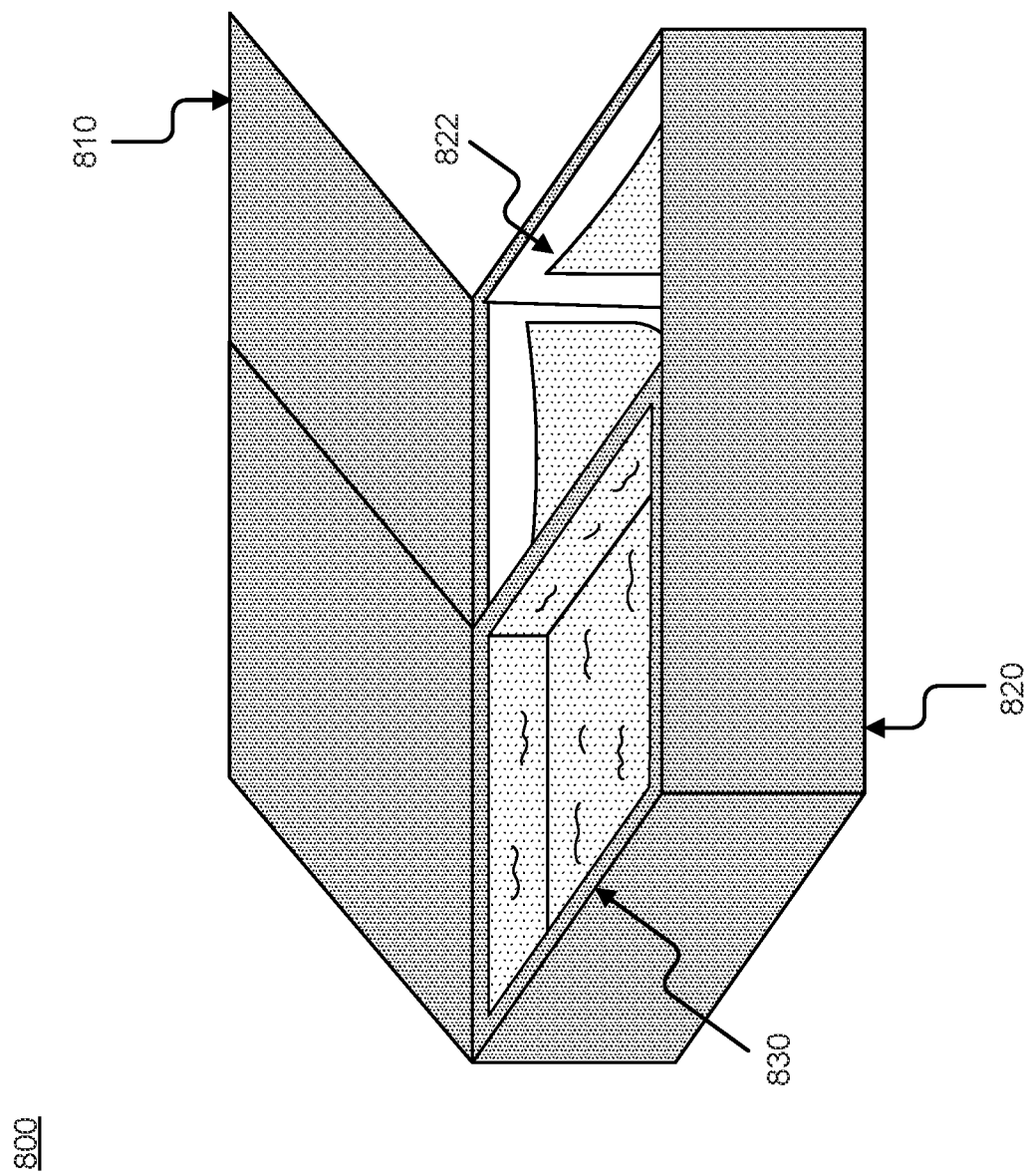
FIG. 8A illustrates exemplary sub-containers within the storage apparatus, according to some embodiments of the present disclosure.

Referring now to FIG. 8A, an exemplary sub-container 830 of a limited size within the container 820 of the storage apparatus 800. In some embodiments, the sub-container 830 may be smaller in dimension than the volume within the container 820. For example, a sub-container for a laptop may be shallow, leaving unused area beneath the container. In some aspects, the unoccupied volume may remain unallocated to another sub-container and may function as a separate storage partition. In some implementations, the excess volume from a sub-container 830 may be complemented with a sub-container. In some embodiments, the interior 822 of the container 820 may contain small compartments such as, but not limited to, pockets to store additional objects.

Figure 8B:
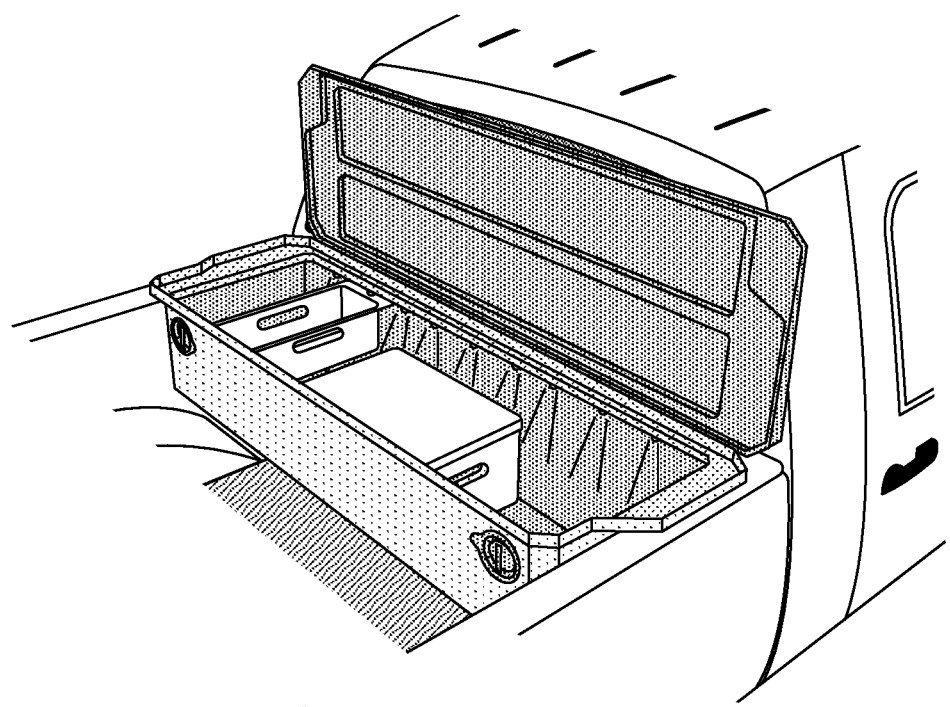
FIG. 8B illustrates exemplary sub-containers within the storage apparatus, according to some embodiments of the present disclosure.
Figure 8C:
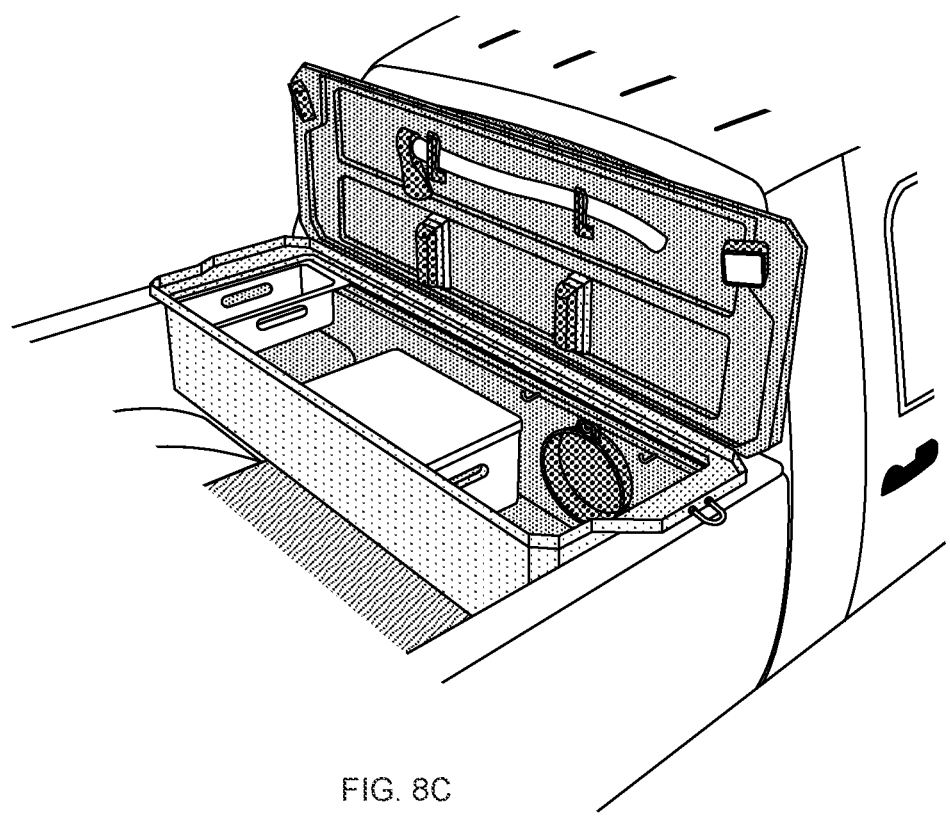
FIG. 8C illustrates exemplary sub-containers within the storage apparatus, according to some embodiments of the present disclosure.

Referring now to FIGS. 8B and 8C, exemplary interior configurations of storage apparatuses are illustrated. In some embodiments, interior configurations may be based on the needs of a user. For example, a camping configuration may allow for storage of objects associated with camping, such as first aid kit, fishing pole, and cooler. In some aspects, a storage apparatus may comprise a lighting mechanism, which may replace or enhance lighting installed on the truck. Lighting may allow for increased ability to view and access the storage apparatus and may support tailgating activities.

Figure 9:
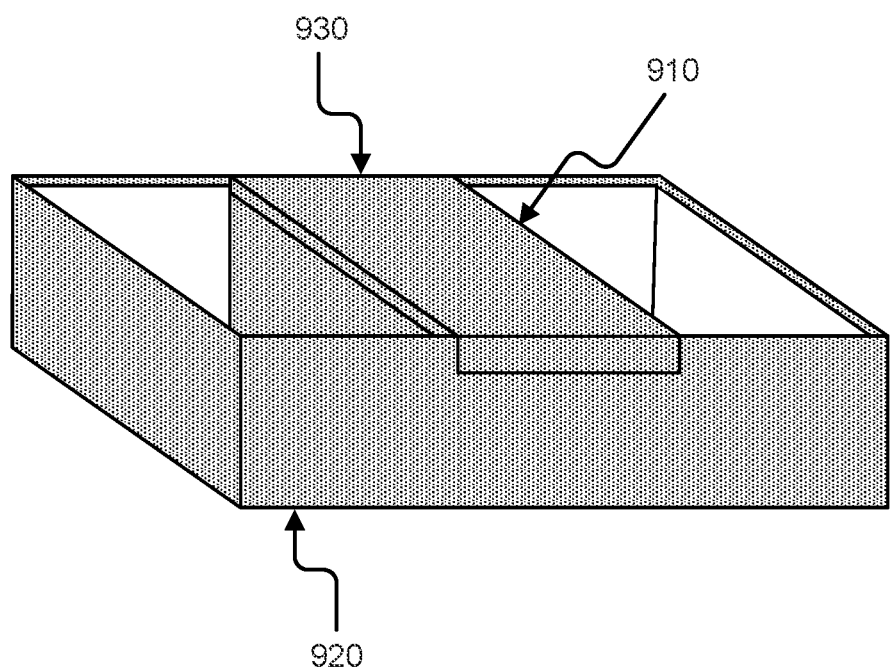
FIG. 9 illustrates an exemplary embodiment of sub-containers within the storage apparatus, according to some embodiments of the present disclosure.

Referring now to FIG. 9, an exemplary container 900 with a number of sub-containers 930. In some aspects, the sub-containers may be repositioned for accessibility. In some implementations, the sub-container 930 may comprise a range of shapes and sizes, allowing for customized segmenting within a container 920. As an illustrative example, six sub-containers may fit into the sub-container 900, which may allow for smaller sections. The six sub-containers 930 may comprise various sizes to accommodate for a range of contents. A sub-container 930 may comprise slender dimensions that may be configured to hold a briefcase and file folders, wherein the sub-container 930 may be located on the driver side of the container 900, allowing for easy access. A user may frequently need to access this sub-container 930. Less used portions may be located centrally to the container 900, as those portions may be more difficult to access.

Figure 10A:
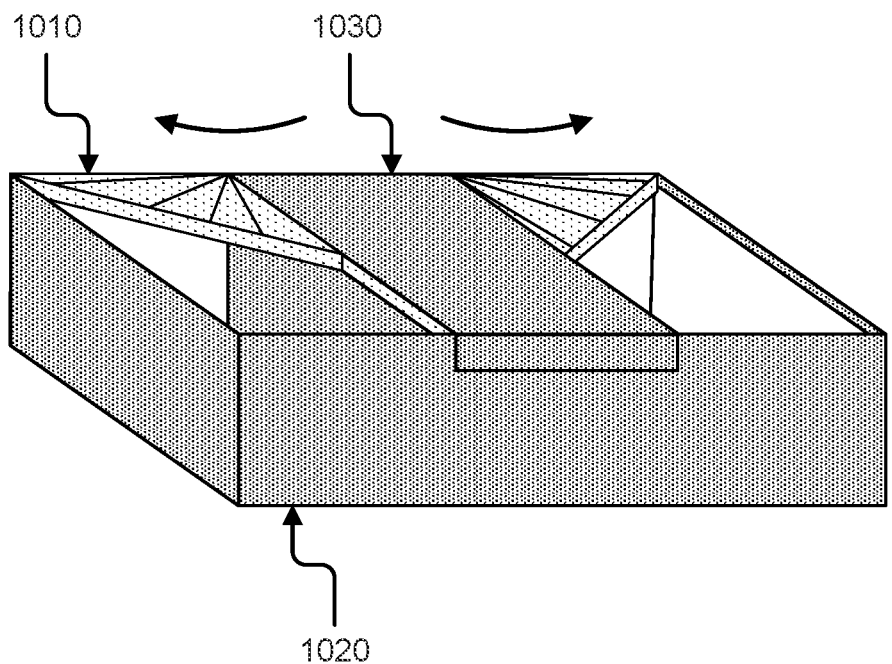
FIG. 10A illustrates exemplary sub-containers within the storage apparatus and lid configurations, according to some embodiments of the present disclosure.
Figure 10B:
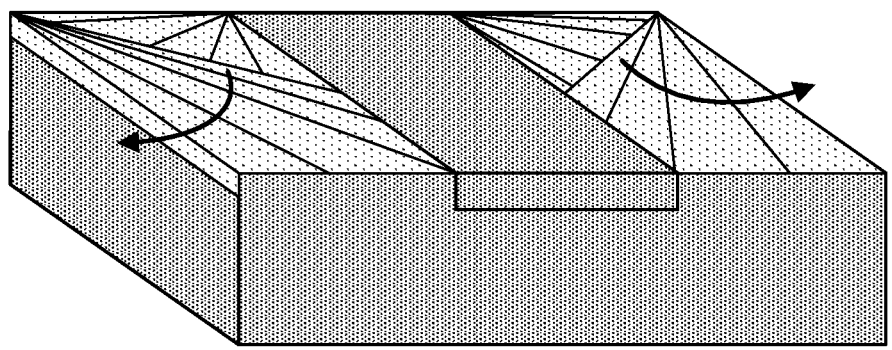
FIG. 10B illustrates exemplary sub-containers within the storage apparatus and lid configurations, according to some embodiments of the present disclosure.
Figure 10C:
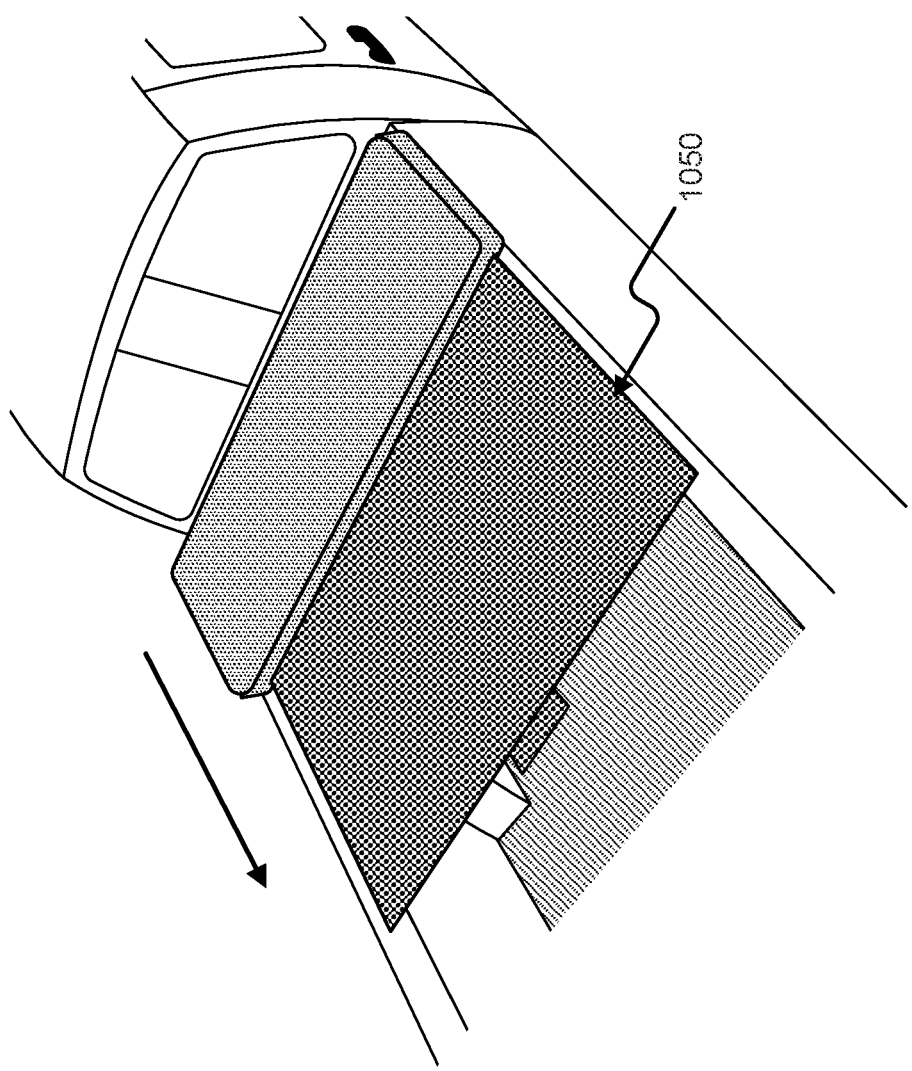
FIG. 10C illustrates an exemplary container with extendable truck bed panel, according to some embodiments of the present disclosure.

Referring now to FIG. 10A, an exemplary container with a number of sub-containers 1030 and lid 1010 configurations is illustrated. In some implementations, where there is vacant area within a container 1020, the lid 1010 may extend from the existing sub-container 1030 to allow for utilization of the vacant area of the storage apparatus 1000. In some implementations, the lid 1010 may enclose any sub-containers 1030 as a second top to the existing sub-container lid 1010. Referring now to FIG. 10B, an exemplary lid enclosing the storage apparatus is illustrated. In some aspects, the lid 1010 may ensure utilization of the entire storage apparatus 1000 when volume unclaimed by sub-containers 1030 may exist.

Referring now to 10C, an exemplary container 1000 with an extension panel 1050 is illustrated. In some embodiments, a container lid may comprise extension panel 1050 which may be extended to at least partially cover a portion of a vehicle, such as a truck bed. A truck bed cover 1050 may protect objects stored within the truck bed in addition to objects stored in the container.

Figure 11A:
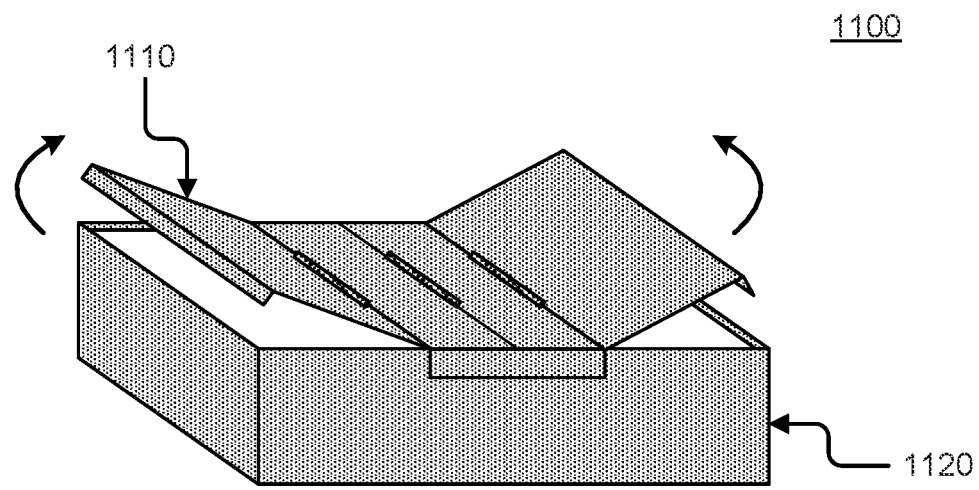
FIG. 11A illustrates exemplary lid configurations, according to some embodiments of the present disclosure.

Referring now to FIG. 11A, an exemplary lid 1110 opening the storage apparatus 1100 via a variety of configurations is illustrated. In some embodiments, the lid 1110 may open from the sides of the storage apparatus 1100. In some aspects, the lid 1110 may bend at predetermined flexion points to allow for accessibility. In some implementations, the lid 1110 may open from the sides of the storage apparatus 1100 for portions closest to the sides of the vehicle and the lid 1110 may open from the front central location of the storage apparatus 1100 for the remaining access. This may allow for easy access to the storage apparatus 1100 without requiring a user to climb into the truck bed or reach across the storage apparatus 1100, which may be dirty or hot.

Figure 11B:
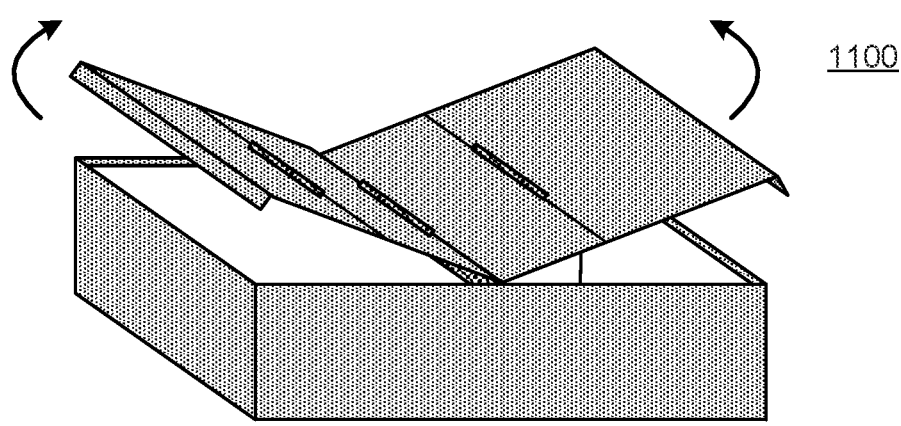
FIG. 11B illustrates exemplary lid configurations, according to some embodiments of the present disclosure.

Referring now to FIG. 11B, an exemplary lid 1110 opening the container from the sides of the storage apparatus. In some embodiments, the lid 1110 may be segmented. For example, the lid 1110 may be divided in half to access the container 1120 from the sides of the storage apparatus 1100. In some implementations, the folding lines of the lid 1110 may be integrated into existing divisions of the lid 1110. For example, the lid 1110 in FIG. 11A may fold in half similar to FIG. 11B in addition to the existing segmentation of the lid 1110.

Figure 11C:
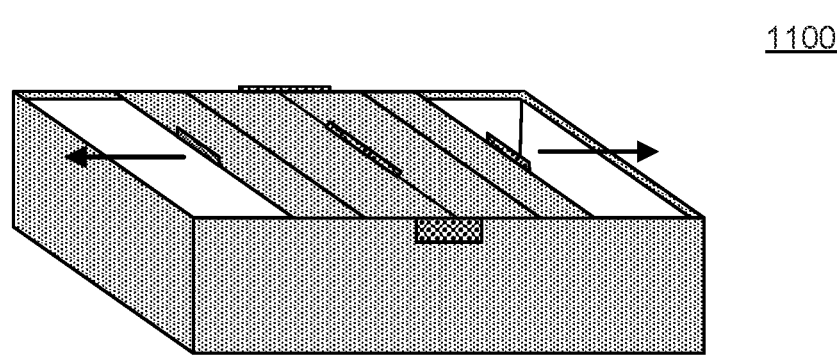
FIG. 11C illustrates exemplary lid configurations, according to some embodiments of the present disclosure.

Referring now to FIG. 11C, an exemplary lid 1110 opening the storage apparatus 1100 is illustrated. In some embodiments, the lid 1110 may retract from the sides towards the center of the storage apparatus 1100 to display contents on each side of the storage apparatus 1100. In some aspects, the lid 1110 may open from the sides and remain a unified panel that may be opened from the front of the storage apparatus 1100. In some aspects, a device may control which sections of the lid 1110 may open simultaneously. For example, a user may be able to select which segment may open and the manner that the segment opens, such as illustrated between FIGS. 11B and 11C. The control may be mechanical, such as through a slide control that may connect or disconnect lid portions as needed. The control may be electronic where a remote or local controller may allow a user to configure how the lid 1100 operates.

Figure 12A:
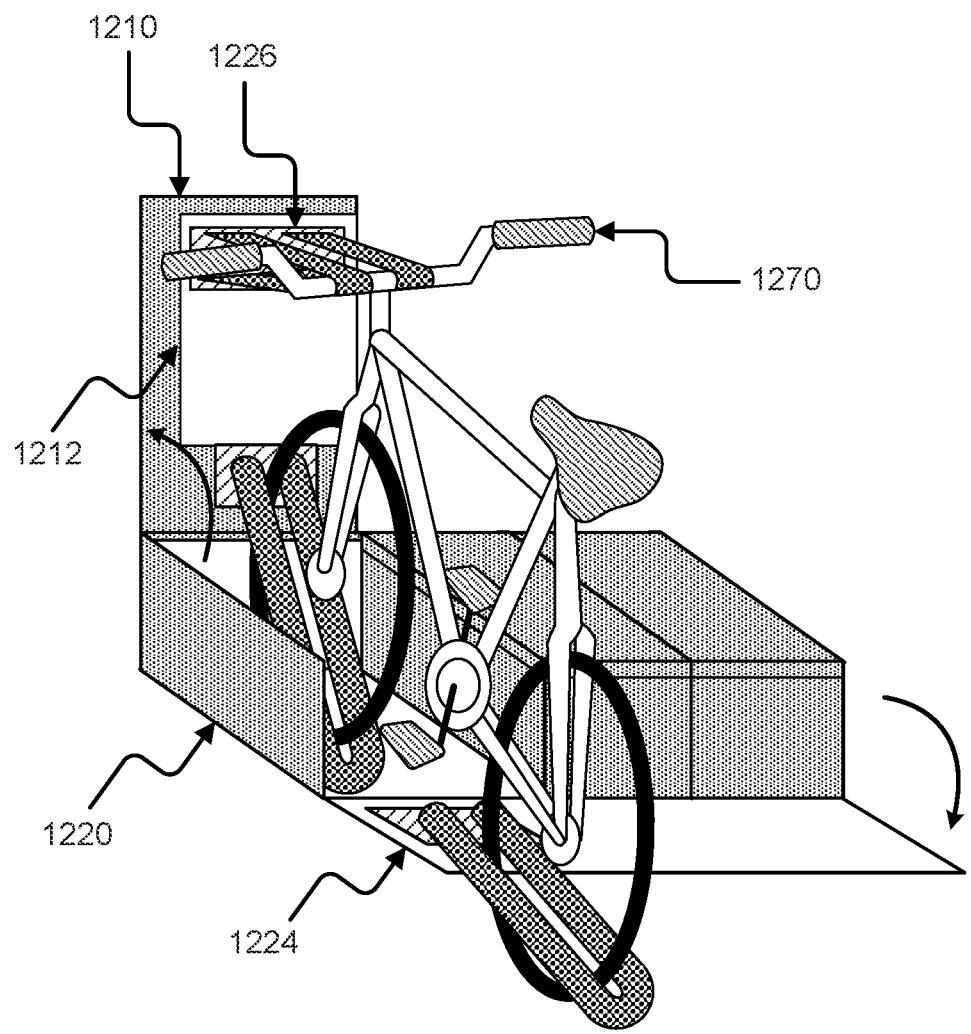
FIG. 12A illustrates exemplary interior securing locations within the storage apparatus and alteration of the container side panels, according to some embodiments of the present disclosure.

Referring now to FIG. 12A, an exemplary storage apparatus 1200 with a collapsing side panel 1224 is illustrated, wherein the collapsing side panel 1224 may accommodate storage of large objects such as, but not limited to, outdoors equipment 1270, tools, or furniture. In some embodiments, the container 1220 may contain interior securing locations 1226 for fastening objects to the storage apparatus 1200. In some aspects, the lid 1210 may be segmented to allow for visibility from the vehicle. For example, both sides of the lid 1210 may be extended to accommodate the securing of large objects such as, but not limited to, a bicycle while the center of the lid 1210 remains collapsed to allow for visibility from the vehicle. In some implementations, a lid 1210 may comprise a transparent window 1212 that may allow for visibility for a driver when the lid 1210 is in an open position.

In some embodiments, the lid 1210 may possess a mechanism to secure the lid 1210 in a static upright position. For example, the lid 1210 may possess a sliding rod that remains within the lid until the lid is extended to a perpendicular angle at which time the rod may slide into a slot or cavity, as non-limiting examples, attached to the container 1220. In some implementations, the lid 1210 may contain exterior anchor or securing location, as non-limiting examples, that may keep the lid 1210 in an open, fixed position. In some embodiments, the interior securing locations 1226 may be configured to hold specific pieces of equipment or equipment within predefined parameters, such as orientation, size, and shape.

Figure 12B:
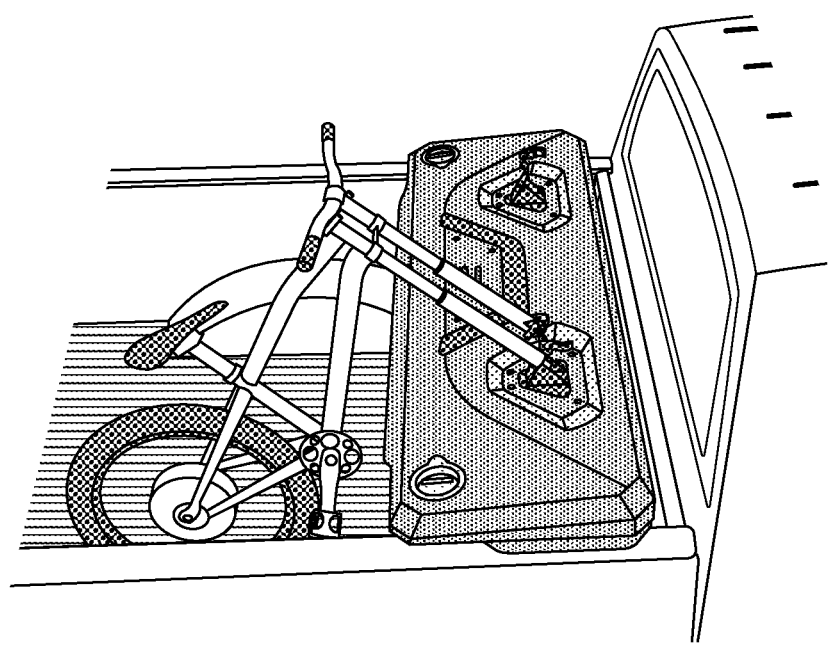
FIG. 12B illustrates exterior securing locations, according to some embodiments of the present disclosure.
Figure 12C:
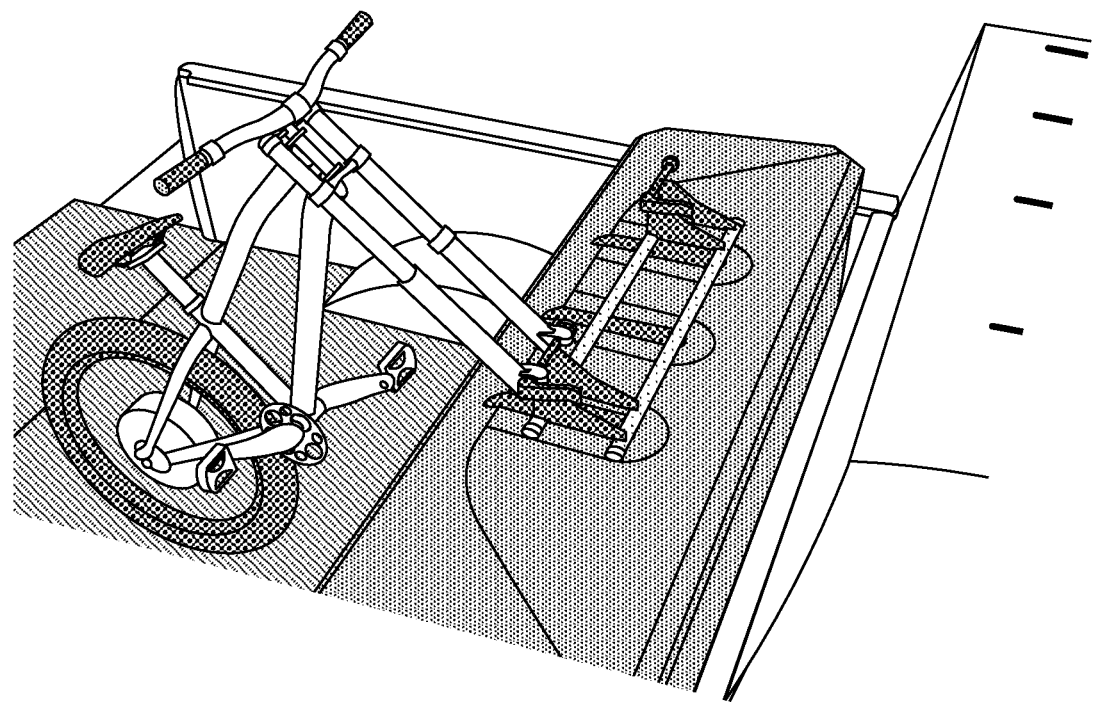
FIG. 12C illustrates exterior securing locations, according to some embodiments of the present disclosure.

Referring now to FIGS. 12B and 12C, exemplary exterior object securing mechanisms for a storage apparatus are illustrated. In some aspects, exterior object securing mechanisms may allow for storage of devices, such as bicycles. In some embodiments, exterior object securing mechanisms may allow for placement of devices in multiple locations.

Figure 13A:
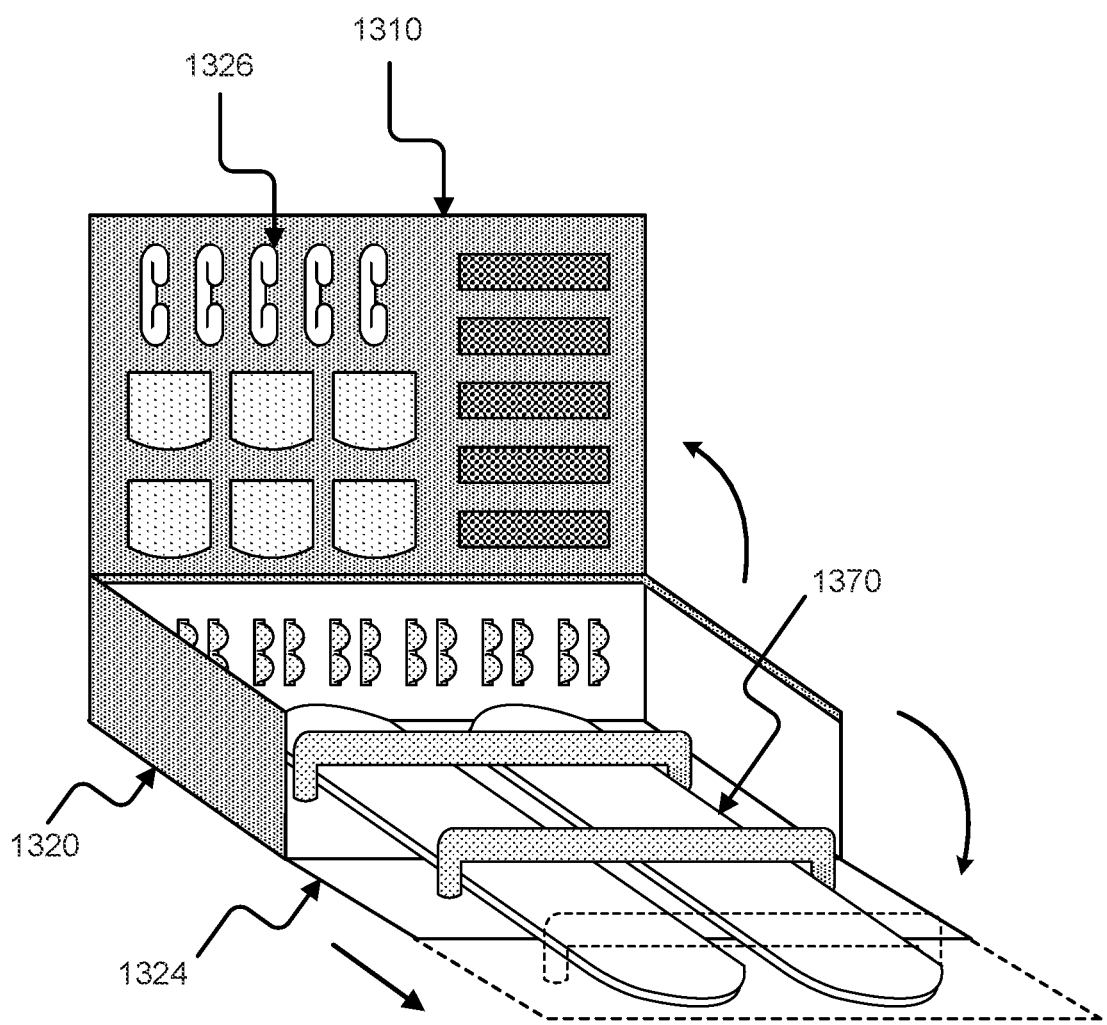
FIG. 13A illustrates exemplary interior securing locations within the storage apparatus and alteration of the container side panels, according to some embodiments of the present disclosure.

Referring now to FIG. 13A, an exemplary embodiment of interior securing locations within the storage apparatus 1300 and alteration of the container side panels 1324 is illustrated. In some implementations, the side panel 1324 of the container 1320 may collapse to allow for objects such as, but not limited to, outdoors equipment 1370 that may extend beyond the boundaries of the storage apparatus 1300. In some embodiments, the side panel 1324 may be secured to the container 1320 in an adjustable manner.

Figure 13B:
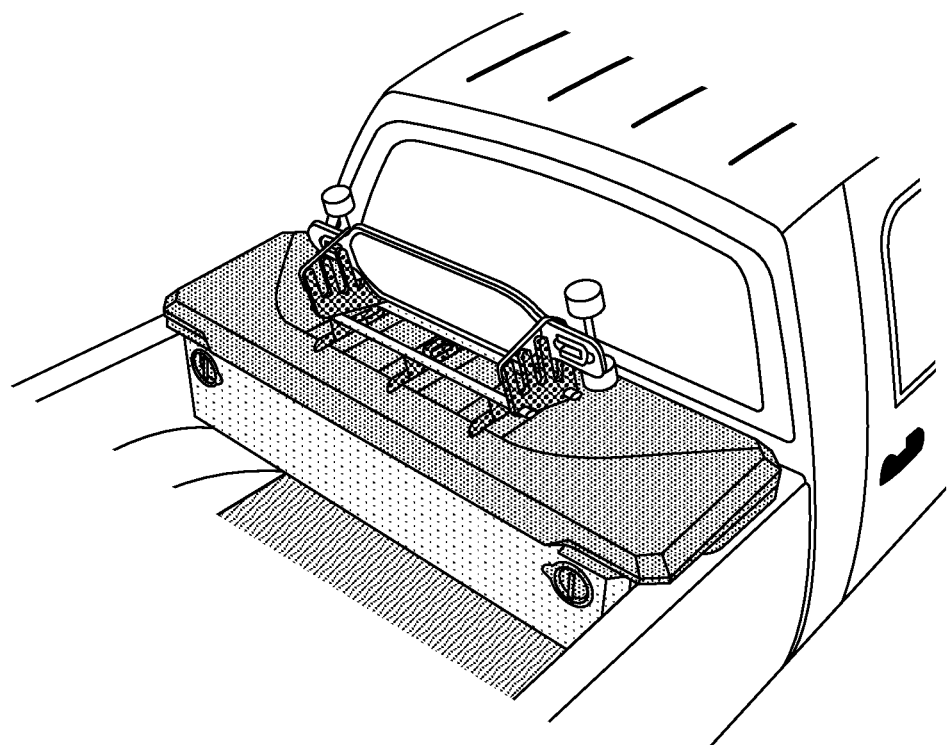
FIG. 13B illustrates exterior securing locations, according to some embodiments of the present disclosure.
Figure 13C:
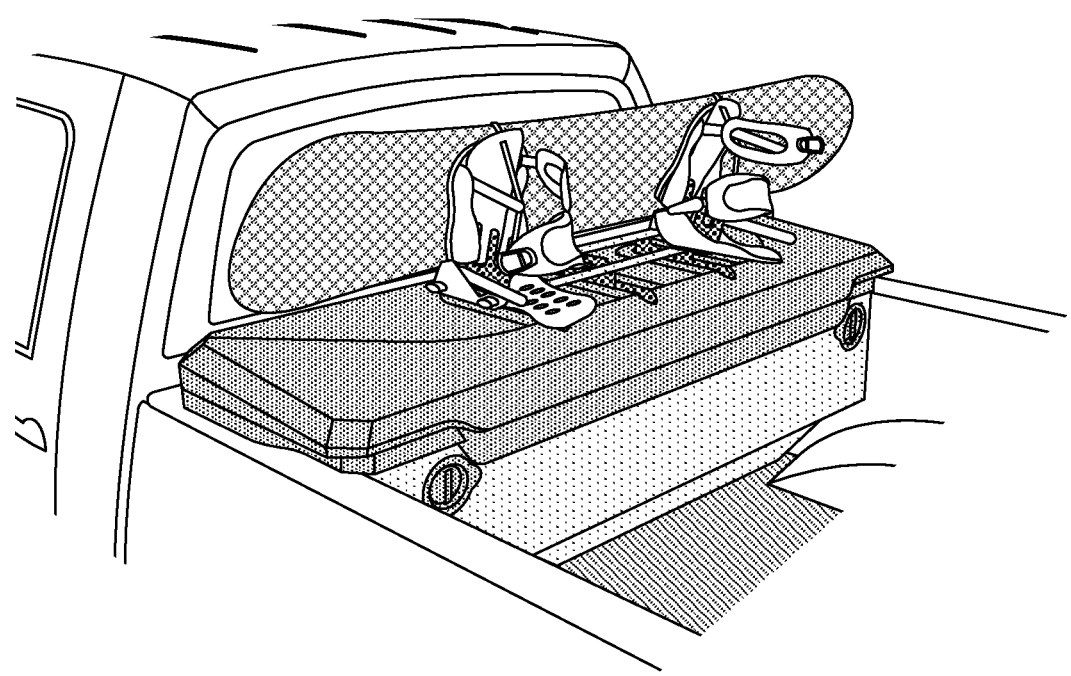
FIG. 13C illustrates exterior securing locations, according to some embodiments of the present disclosure.

Referring now to FIGS. 13B and 13C, exemplary exterior object securing mechanisms for a storage apparatus are illustrated. In some aspects, equipment may be stored on the exterior of a storage apparatus, allowing for more storage in the interior of the storage apparatus. In some embodiments, exterior object securing mechanisms may be detachable based on need.

For example, the collapsible side panel 1324 may click in and out of place with the rest of the container 1320 by adjusting a slide and bolt at the edge between the side panel 1324 and the container 1320. In some aspects, the interior securing locations 1326 may comprise a number of object securing mechanisms or methods. For example, the interior securing locations 1326 may include object securing mechanisms in the form of straps for accessories, racks for flat boards, hooks for accessories, or rack allotments as non-limiting examples. In some embodiments, the side panel 1324 may extend beyond the original height to accommodate objects of greater length that may utilize the interior securing locations 1326. In some aspects, the extended side panel 1324 may contain securing locations with the intended purpose of securing the panel to the vehicle.

Figure 14A:
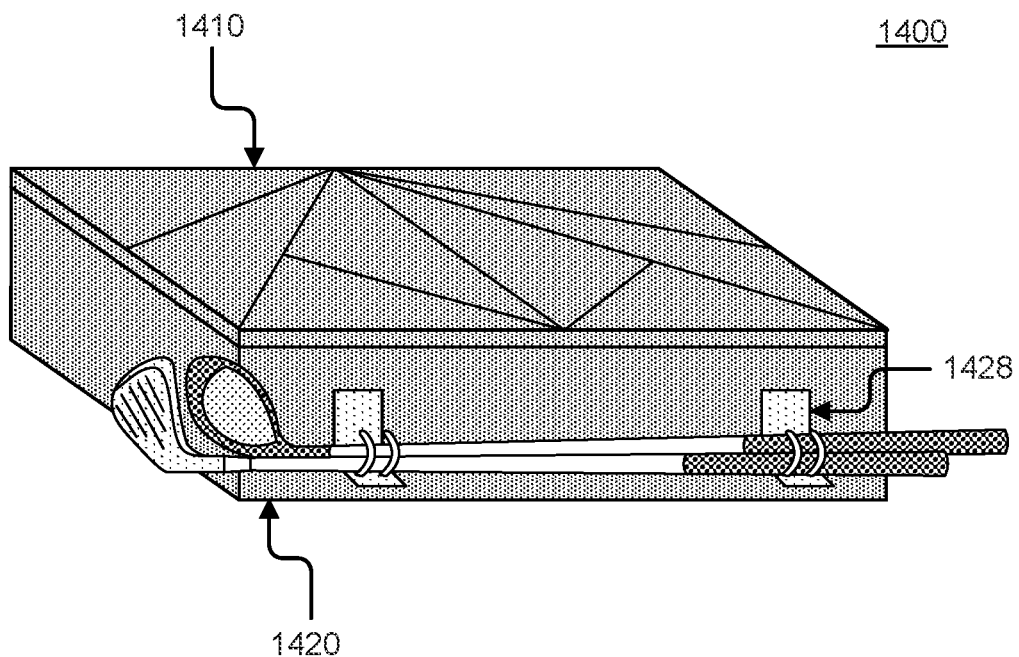
FIG. 14A illustrates exemplary exterior securing locations, according to some embodiments of the present disclosure.

Referring now to FIG. 14A, an exemplary embodiment of exterior securing locations 1428 is illustrated. In some implementations, the exterior securing locations 1428 may include object securing mechanisms that exist within the side panel 1424 of the container 1420. For example, the exterior securing locations 1428 may extend from the container 1420 when a small amount of force is applied. In some implementations, the exterior securing locations 1428 may extend from the container 1420 by means of manual extension from an indented recess in the surface of the side panel 1424.

Figure 14B:
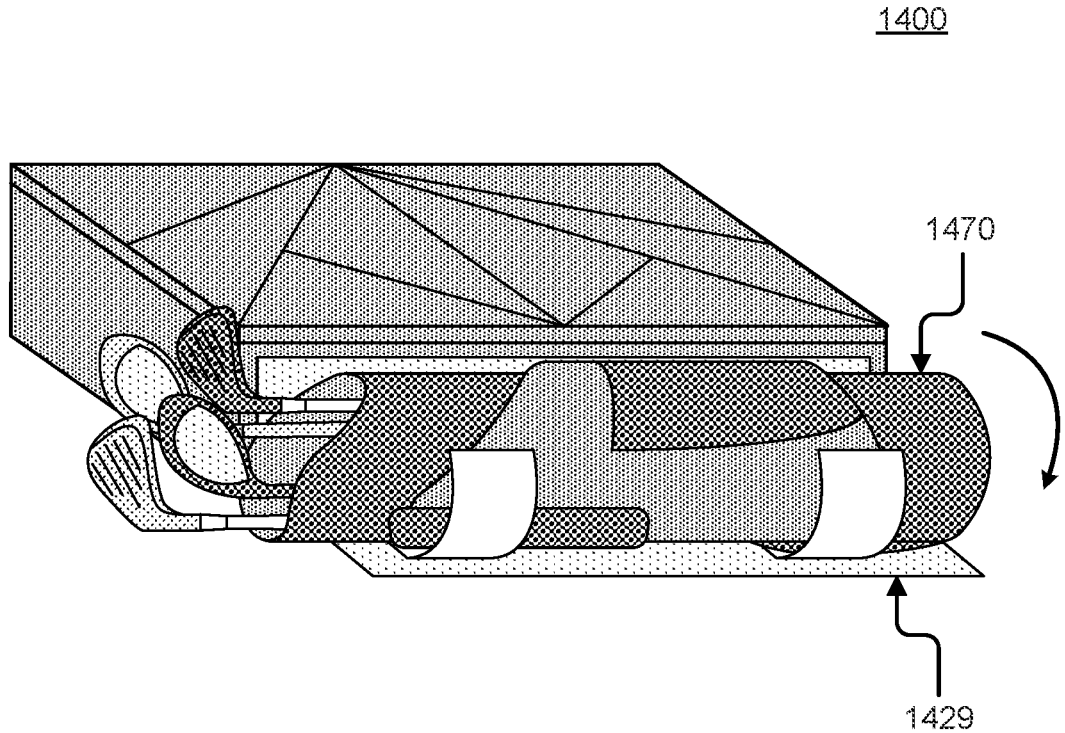
FIG. 14B illustrates an exemplary exterior securing panel, according to some embodiments of the present disclosure.

Referring now to FIG. 14B, an exemplary embodiment of exterior securing panel is illustrated. In some embodiments, the extension of the exterior securing panel may be an electronic response to a signal received by an external signal device. In some implementations, the power required by electronic automation may be supplied from an external source. In some embodiments, the power supplied for electronic automation may be supplied from an internal energy storage source. In some aspects, the exterior securing panel may be stabilized by an external support mechanism. For example, once the exterior securing panel is extended, a mechanism may extrude from the container or the panel to provide structural support.

Figure 14C:
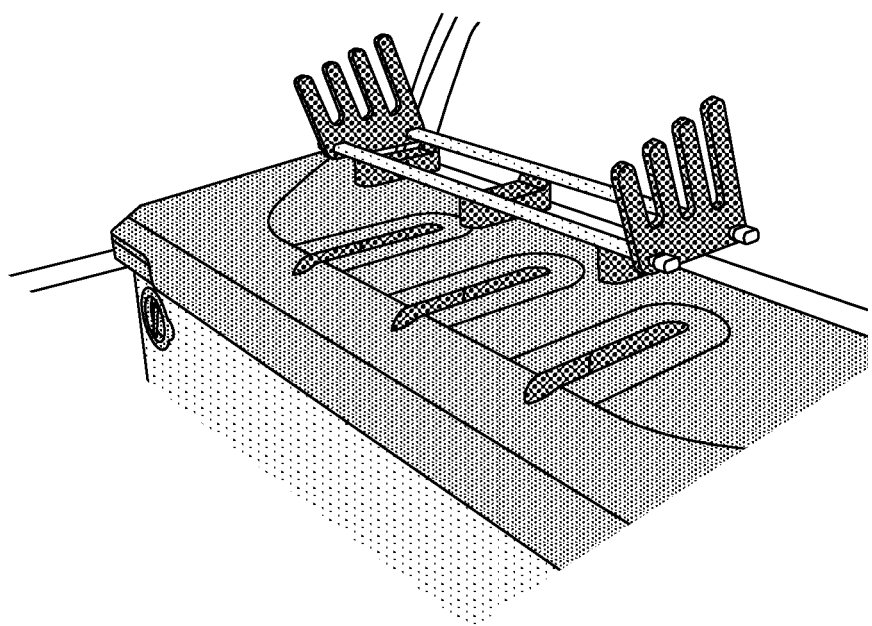
FIG. 14C illustrates an exemplary exterior securing panel, according to some embodiments of the present disclosure.
Figure 14D:
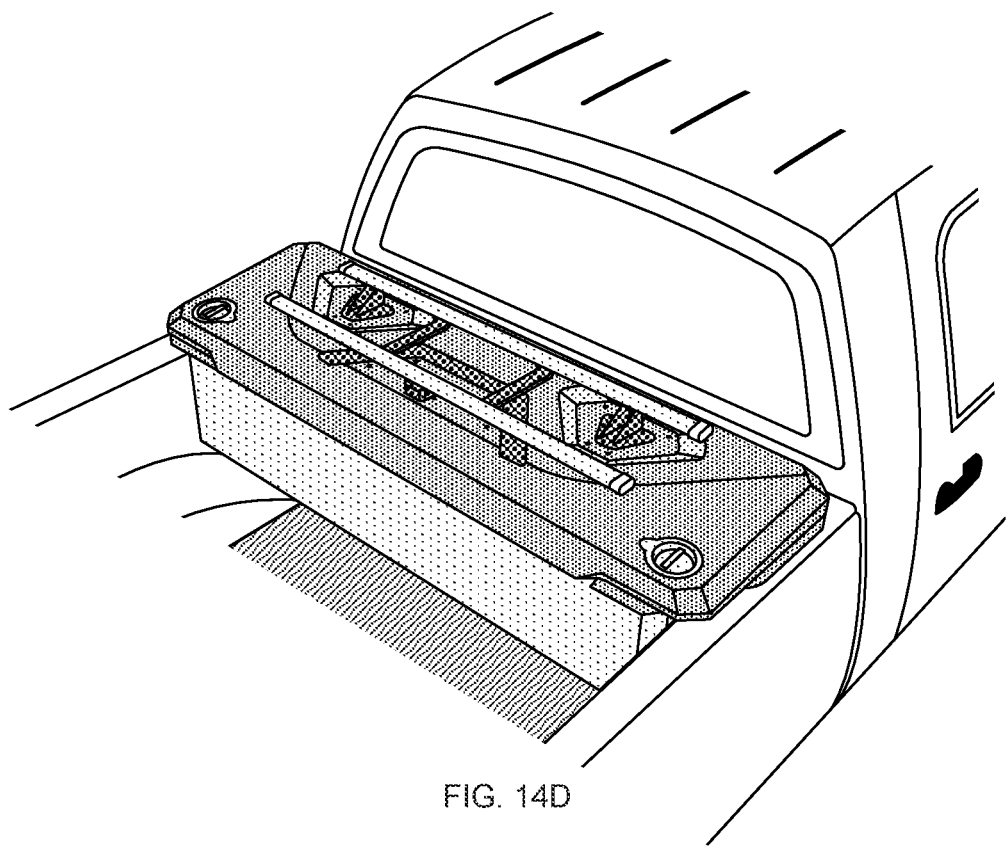
FIG. 14D illustrates an exemplary exterior securing panel, according to some embodiments of the present disclosure.
Figure 14E:
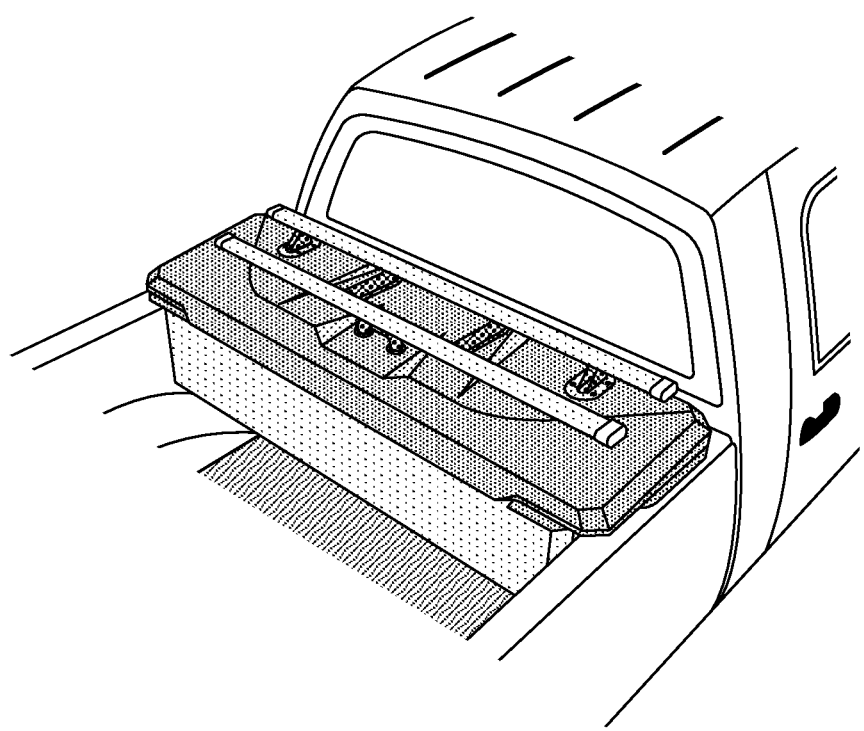
FIG. 14E illustrates an exemplary exterior securing panel, according to some embodiments of the present disclosure.

Referring now to FIGS. 14C-14E, exemplary exterior securing panels for a storage apparatus are illustrated. In some aspects, configuration of exterior securing panels may allow for customization based on user needs. For example, a user transporting large pieces of equipment may prefer a larger exterior securing panel.

Figure 15C:
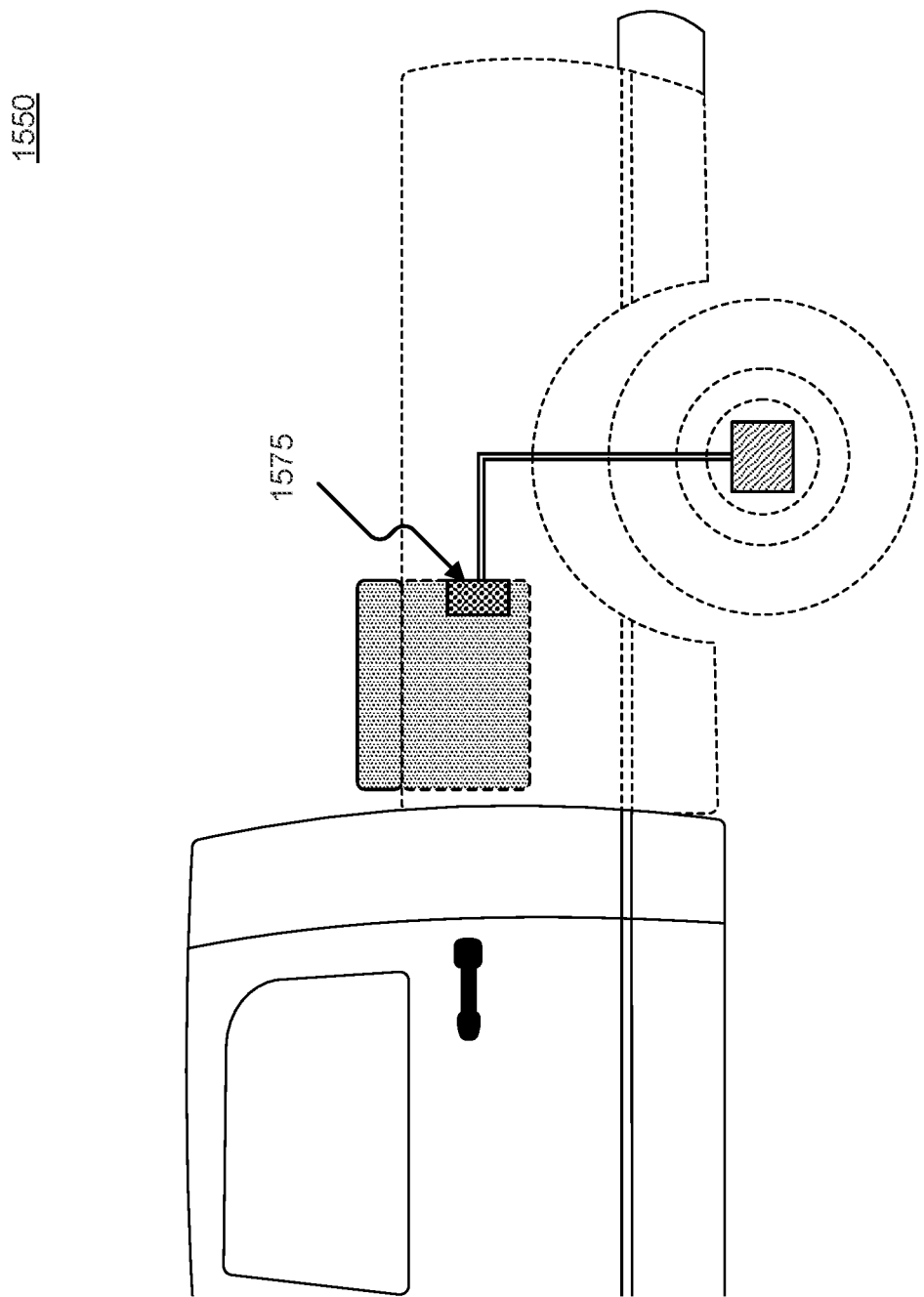
FIG. 15C illustrates exemplary energy collecting devices connected to the lid, according to some embodiments of the present disclosure.

Referring now to FIGS. 15A-15C, an exemplary embodiment of power generating devices connected to the lid is illustrated. In some aspects, the power generating device 1515, 1565 may be attached to the lid 1510 in a removeable method. In some implementations, the power generated may be output to the storage apparatus 1500 to supply power to external devices, sub-containers that may utilize power to cool the sub-container, or internal systems such as work lights in the interior of the lid 1510 as non-limiting examples. In some embodiments, the power generating device 1575 may utilize kinetic energy generated by rotation of truck wheels during travel.

For example, the storage apparatus may contain external electrical ports for attaching cords designed to provide power to external devices. In some embodiments, the power generated may be stored in a power storage device. For example, a battery may be stored within the storage apparatus that may store an electrical charge. The battery may be removeable to use in a number of situations, such as to power equipment or machinery that may be stored in the storage apparatus. In some aspects, the power generating device may output the acquired power to the vehicle, such as to support a low battery of the truck, as a secondary supply of power for when the truck is not on, or to provide additional power outlets, as non-limiting examples.

Figure 16A:
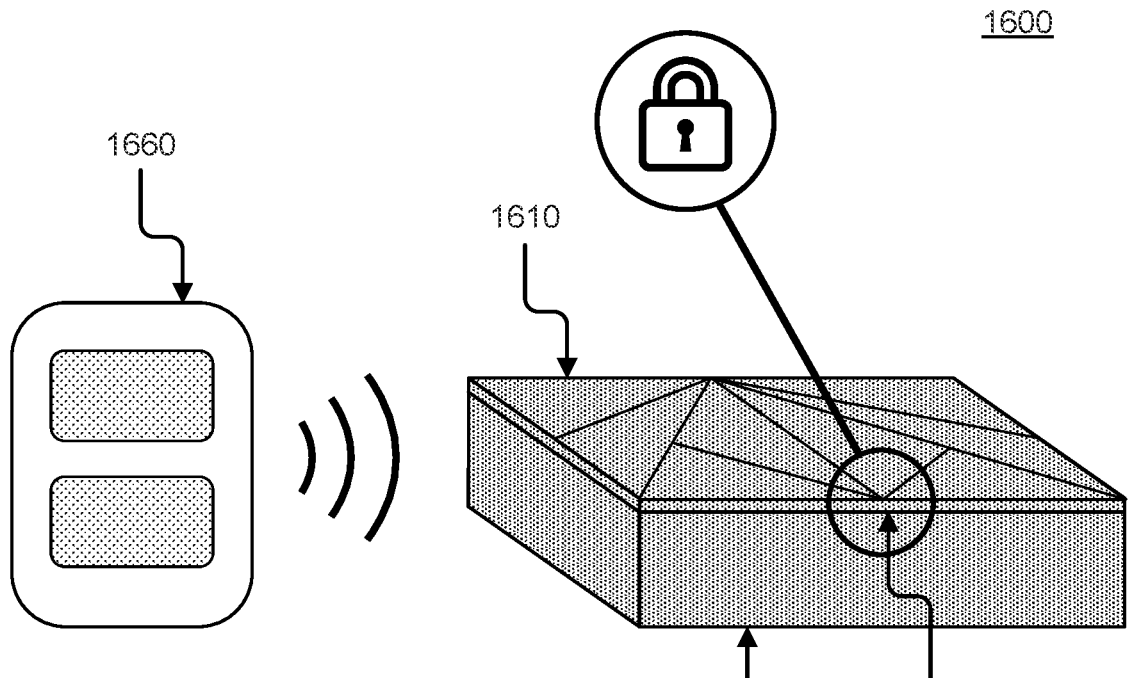
FIG. 16A illustrates an exemplary securing system between a storage apparatus and an external signal device, according to some embodiments of the present disclosure.
Figure 16B:
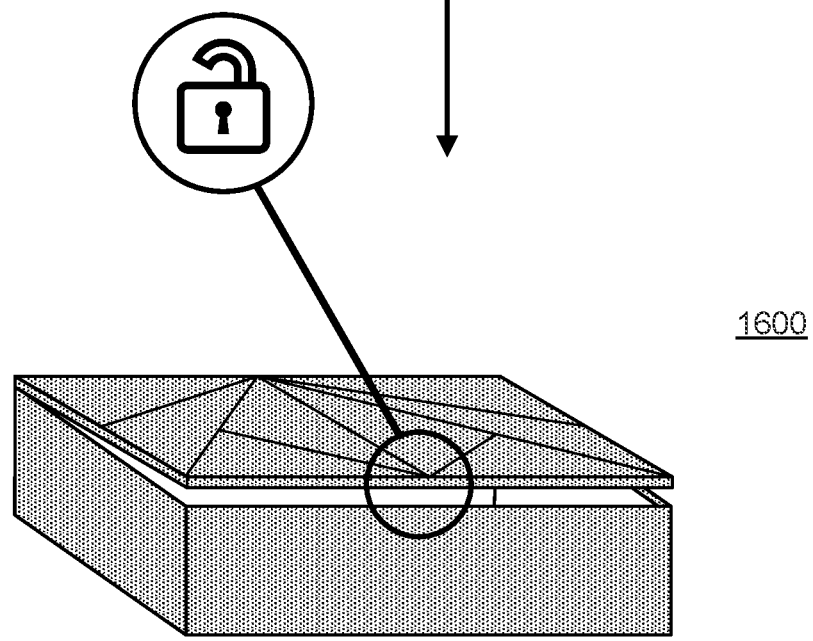
FIG. 16B illustrates an exemplary securing system between a storage apparatus and an external signal device, according to some embodiments of the present disclosure.

Referring now to FIG. 16A, an exemplary embodiment of securing system between the storage apparatus 1600 and an external signal device 1660 is illustrated. In some aspects, the storage apparatus may be secured utilizing a key lock, a combination lock, an electronic locking system as non-limiting examples. Referring now to FIG. 16B, an exemplary embodiment of securing mechanism 1650 between the storage apparatus 1600 and an external signal device 1660 is illustrated. In some embodiments, manual control of the securing mechanism 1650 may control whether the external signal device 1660 may have permission to operate the storage apparatus. For example, a user may be able to lock the storage apparatus 1600 and deny permission for remote access.

In some implementations, an electronic locking mechanism 1650 may lock when directed by an external signal device 1660. In some aspects, the external signal device 1660 may be integrated into existing systems within the vehicle. For example, the button required to unlock the storage apparatus may be embedded within the cabin of the vehicle similar to integrated garage door openers, where the storage apparatus opener may be synched with an internal control panel. In some embodiments, the external signal device 1660 may unlock the storage apparatus when proximal to the storage apparatus 1600, such as exemplary embodiments wherein the external signal device 1660 may comprise a key fob with a proximity sensor. In some implementations, an electronic locking mechanism 1650 may lock when directed by an external signal device 1660, such as, for example and not limitation, in implementations wherein the external signal device 1660 may take the form of a remote-control device with at least one button.

In some embodiments, the electronic locking mechanism 1650 may be powered from an external source. The external source may provide charge to an electrical charge storage device that then distributes energy to the locking mechanism 1650 as needed. In some aspects, the electronic locking mechanism 1650 may be powered by an internal power source. For example, solar panels may be attached to the lid 1610 that store power within an electrical charge storage device which is used to provide power to the locking mechanism 1650.

Figure 17A:
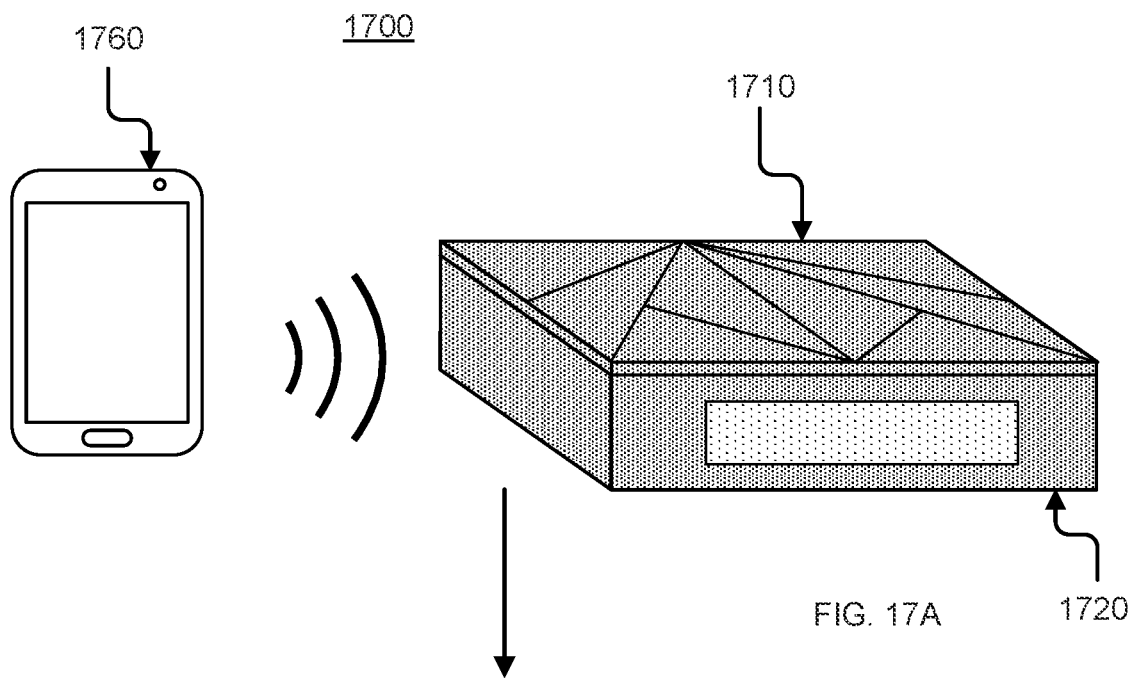
FIG. 17A illustrates an exemplary altering storage apparatus configuration utilizing an external signal device, according to some embodiments of the present disclosure.

Referring now to FIG. 17A, an exemplary embodiment of altering storage apparatus 1700 configuration utilizing an external signal device 1760 is illustrated. In some embodiments, an external signal device 1760 may provide options for configuring the available securing locations and associated object securing mechanisms. In some aspects, the container 1720 may contain a number of securing locations. In some embodiments, these securing locations 1728 may be embedded within a side panel 1724 that may rotate in response to signals received by an external signal device 1760.

Figure 17B:
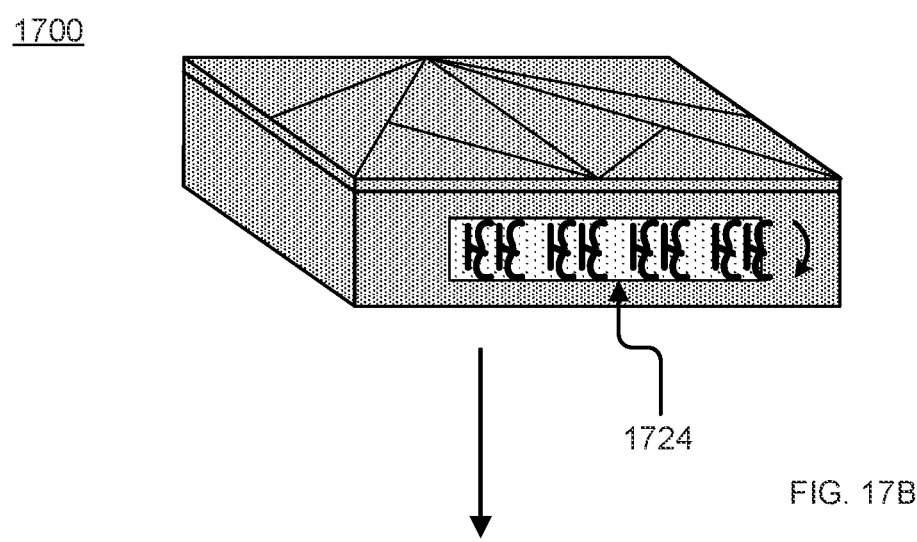
FIG. 17B illustrates an exemplary adjustable storage apparatus utilizing an external signal device, according to some embodiments of the present disclosure.
Figure 17C:
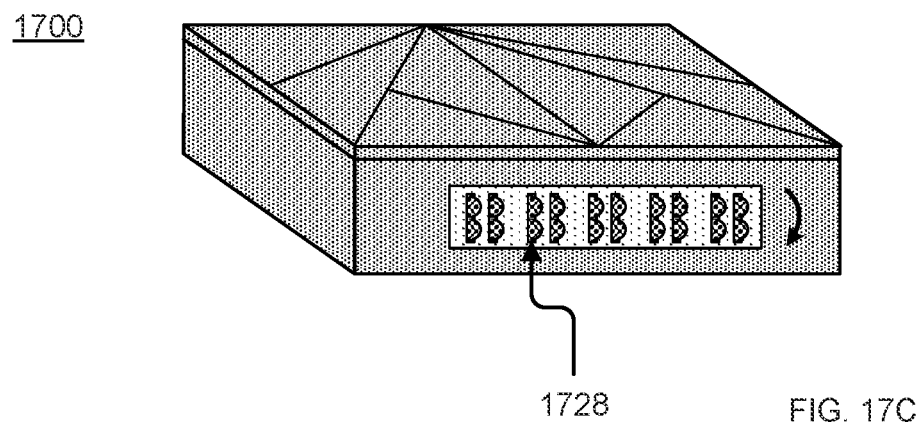
FIG. 17C illustrates an exemplary adjustable storage apparatus utilizing an external signal device, according to some embodiments of the present disclosure.

Referring now to FIG. 17B, an exemplary embodiment of an external securing location 1728 is illustrated. In some aspects, the hidden portions of a rotating panel of external securing locations 1728 may be stored within the container 1720. Referring now to FIG. 17C, an exemplary embodiment of an external securing location 1728 is illustrated. In some implementations, the panel 1724 may possess an attachment feature to attach the external securing locations 1728. For example, a bike rack attachment may be connected to the front panel of the storage apparatus and other securing location 1728 options may be stored within the storage apparatus 1700.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A storage apparatus configured to fit within a rear portion of a vehicle, the storage apparatus comprising:
    a container comprising a base, at least three side panels, and a substantially open top portion, wherein the container comprises at least one subcomponent; and
    a lid configured to at least partially cover the top portion of the container; wherein a rear portion of the lid is attached to an upper portion of the container via at least one hinge; wherein the lid comprises two long sides, a first short side, a second short side, a center portion, a first side portion, and a second side portion; wherein the first side portion is proximate to the first short side and the second side portion is proximate to the second short side; wherein the center portion, the first side portion, and the second side portion each comprise a planar surface; wherein the planar surfaces of the center portion, the first side portion, and the second side portion are oriented in three different directions; wherein a surface area of the center portion is larger than a surface area of the first side portion and the second side portion; wherein the planar surfaces of the first side portion and the second side portion taper from the rear portion of the lid toward a front portion of the lid; and wherein a top surface of the lid does not comprise any 90-degree corners.

2. The storage apparatus of claim 1, wherein one or more of the at least three side panels may be adjusted to fit a size or shape of a location on the vehicle where the storage apparatus is to be installed.

3. The storage apparatus of claim 1, wherein the at least one subcomponent comprises at least one object securing panel that comprises at least one object securing mechanism, wherein the at least one object securing panel is stored within one or more of the at least three side panels and may be extended to an exposed position on an exterior portion of the storage apparatus when directed by an external signal device.

4. The storage apparatus of claim 1, wherein the at least one subcomponent comprises at least one lighting mechanism powered by at least one rechargeable battery, wherein the at least one rechargeable battery is configured to store energy collected by at least one solar panel, wherein the at least one lighting mechanism is configured on an inner surface of the lid and the at least one solar panel is configured on an outer surface of the lid.

5. The storage apparatus of claim 1, wherein the lid comprises an inner surface that comprises at least one reinforcing mechanism.

6. The storage apparatus of claim 5, wherein the at least one reinforcing mechanism comprises at least one of: an amount of insulating material, an amount of cooling material, a lattice structure, a supporting frame, and at least one reinforcing bar.

7. The storage apparatus of claim 1, wherein the container comprises four side panels; and wherein an inner surface of the lid comprises at least one folding rack bar.

8. The storage apparatus of claim 1, wherein the at least one subcomponent comprises at least one of: a sub-container, an amount of insulating material, a storage apparatus securing device, an interior divider, a power source, a lighting mechanism, an object securing mechanism, an extension panel, an electrical port, and a securing system.

9. The storage apparatus of claim 8, wherein the at least one subcomponent comprises at least one power source, wherein the at least one power source comprises at least one of: a power storage device, a power generating device, and an energy collecting device.

10. The storage apparatus of claim 9, wherein the at least one power source comprises at least one power storage device, wherein the at least one power storage device comprises at least one battery.

11. The storage apparatus of claim 9, wherein the at least one power source comprises at least one power generating device, wherein the at least one power generating device is configured to utilize kinetic energy generated by a rotation of at least one wheel that the vehicle uses for mobility.

12. The storage apparatus of claim 9, wherein the at least one power source comprises at least one energy collecting device, wherein the at least one energy collecting device comprises at least one solar panel.

13. The storage apparatus of claim 8, wherein the at least one subcomponent comprises at least one object securing mechanism configured to secure one or more objects to the storage apparatus, wherein the at least one object securing mechanism comprises at least one of: a strap, a rack, and a hook.

14. The storage apparatus of claim 8, wherein the at least one subcomponent comprises at least one extension panel, wherein the at least one extension panel is configured to at least partially cover a portion of the vehicle.

15. The storage apparatus of claim 8, wherein the at least one subcomponent comprises at least one securing system, wherein the at least one securing system comprises at least one of: a key lock, a combination lock, and an electronic locking system.

16. The storage apparatus of claim 15, wherein the at least one securing system comprises an electronic locking system, wherein the electronic locking system is directed by an external signal device.

17. The storage apparatus of claim 16, wherein the external signal device comprises a key fob with a proximity sensor.

18. The storage apparatus of claim 8, wherein the at least one subcomponent comprises at least one sub-container, wherein a size of the at least one sub-container is adjustable.

19. The storage apparatus of claim 8, wherein the at least one subcomponent comprises two or more object securing mechanisms, wherein the two or more object securing mechanisms are stored enclosed within at least one of the at least three side panels, wherein the at least one of the at least three side panels rotates to move at least one of the two or more object securing mechanisms to an exposed position when directed by an external signal device.

20. The storage apparatus of claim 8, wherein the at least one subcomponent comprises at least one vertically-oriented interior divider that spans across a width of a sub-container, wherein the at least one interior divider comprises a uniform height that is adjustable.

* * * * *